US010921143B2

(12) United States Patent
Katsuki et al.

(10) Patent No.: US 10,921,143 B2
(45) Date of Patent: Feb. 16, 2021

(54) INFORMATION PROCESSING DEVICE, MOBILE OBJECT, INFORMATION PROCESSING METHOD, AND COMPUTER PROGRAM PRODUCT

(71) Applicant: Kabushiki Kaisha Toshiba, Minato-ku (JP)

(72) Inventors: Rie Katsuki, Kawasaki (JP); Tsuyoshi Tasaki, Yokohama (JP)

(73) Assignee: Kabushiki Kaisha Toshiba, Minato-ku (JP)

(*) Notice: Subject to any disclaimer, the term of this patent is extended or adjusted under 35 U.S.C. 154(b) by 115 days.

(21) Appl. No.: 15/913,053

(22) Filed: Mar. 6, 2018

(65) Prior Publication Data

US 2018/0364060 A1 Dec. 20, 2018

(30) Foreign Application Priority Data

Jun. 20, 2017 (JP) ................................. 2017-120508

(51) Int. Cl.
G01C 21/34 (2006.01)
G06Q 10/04 (2012.01)
G08G 1/16 (2006.01)

(52) U.S. Cl.
CPC ..... G01C 21/3461 (2013.01); G01C 21/3415 (2013.01); G01C 21/3492 (2013.01); G06Q 10/047 (2013.01); G08G 1/165 (2013.01)

(58) Field of Classification Search
CPC ............ G01C 21/3461; G01C 21/3492; G01C 21/3415; G08G 1/165; G06Q 10/047
USPC ........................................................ 701/467
See application file for complete search history.

(56) References Cited

U.S. PATENT DOCUMENTS

| 2009/0037052 | A1 | 2/2009 | Ogasawara et al. | |
|---|---|---|---|---|
| 2016/0167702 | A1* | 6/2016 | Morimoto | B62D 15/025 701/41 |
| 2016/0229389 | A1* | 8/2016 | Hirano | B60W 20/13 |
| 2016/0363454 | A1* | 12/2016 | Hatanaka | G01C 21/34 |

(Continued)

FOREIGN PATENT DOCUMENTS

| JP | 7-225612 A | 8/1995 |
|---|---|---|
| JP | 7-281748 | 10/1995 |

(Continued)

OTHER PUBLICATIONS

Yoshiaki Kuwata et al. "Real-Time Motion Planning With Applications to Autonomous Urban Driving," IEEE Transactions on Control Systems Technology, vol. 17, No. 5, Sep. 2009, pp. 14.

(Continued)

*Primary Examiner* — Behrang Badii
*Assistant Examiner* — Hossam M Abd El Latif
(74) *Attorney, Agent, or Firm* — Oblon, McClelland, Maier & Neustadt, L.L.P.

(57) ABSTRACT

According to an embodiment, an information processing device includes a memory; and one or more processors coupled to the memory. The one or more processors are configured to: arrange a node in a first region not interfering with an object on a scheduled traveling route; arrange a node in a second region around an interference region interfering with the object; and search for a route going through a plurality of nodes and having a moving cost from a first point to a second point on the scheduled traveling route equal to or smaller than a threshold.

17 Claims, 14 Drawing Sheets

(56) References Cited

U.S. PATENT DOCUMENTS

| | | | |
|---|---|---|---|
| 2017/0059343 A1* | 3/2017 | Spinelli | G01C 21/20 |
| 2017/0116862 A1* | 4/2017 | Inoue | G01C 21/3697 |
| 2017/0285646 A1* | 10/2017 | Connor | B60W 40/04 |
| 2018/0051996 A1 | 2/2018 | Katsuki et al. | |
| 2018/0238697 A1* | 8/2018 | Maru | G01C 21/3461 |
| 2018/0251029 A1 | 9/2018 | Tasaki et al. | |
| 2018/0267548 A1* | 9/2018 | Sumioka | G05D 1/0214 |

FOREIGN PATENT DOCUMENTS

| | | |
|---|---|---|
| JP | 3269418 | 3/2002 |
| JP | 2005-50105 | 2/2005 |
| JP | 2006-154967 A | 6/2006 |
| JP | 2008-230467 A | 10/2008 |
| JP | 2011-118609 | 6/2011 |
| JP | 4949063 | 6/2012 |
| JP | 2012-190405 | 10/2012 |
| JP | 5336800 | 11/2013 |
| JP | 2017-16645 A | 1/2017 |
| JP | 2018-28479 A | 2/2018 |
| JP | 2018-147052 A | 9/2018 |
| WO | 2011/101988 A1 | 8/2011 |

OTHER PUBLICATIONS

Moritz Werling et al. "Optimal trajectories for time-critical street scenarios using discretized terminal manifolds," The International Journal of Robotics Research, vol. 31, No. 3, Dec. 2011, pp. 16.

* cited by examiner

INFORMATION PROCESSING DEVICE, MOBILE OBJECT, INFORMATION PROCESSING METHOD, AND COMPUTER PROGRAM PRODUCT

CROSS-REFERENCE TO RELATED APPLICATIONS

This application is based upon and claims the benefit of priority from Japanese Patent Application No. 2017-120508, filed on Jun. 20, 2017; the entire contents of which are incorporated herein by reference.

FIELD

An embodiment described herein relates generally to an information processing device, a mobile object, an information processing method, and a computer program product.

BACKGROUND

An automatic driving technique for automatically steering an automobile has been attracting attention. For example, disclosed is a technique for generating a route for avoiding collision with an object such as an obstacle. There is also disclosed a technique for randomly arranging nodes in a traveling region and searching for a route having lower traveling cost among a plurality of routes sequentially going through a plurality of nodes from a present location to a destination.

However, in the related art, the nodes are randomly arranged in the entire traveling region, or the nodes are randomly arranged in a range corresponding to the shape of the traveling region or time elapsed from start of traveling. Thus, in the related art, a random sampling region for searching for the route becomes a wide range, and a route having poor quasi-optimality may be searched for.

DETAILED DESCRIPTION

According to an embodiment, an information processing device includes a memory and one or more processors coupled to the memory. The one or more processors are configured to: arrange a node in a first region not interfering with an object on a scheduled traveling route; arrange a node in a second region around an interference region interfering with the object; and search for a route going through a plurality of nodes and having a moving cost from a first point to a second point on the scheduled traveling route equal to or smaller than a threshold.

The following describes an information processing device, a mobile object, an information processing method, and a computer program product in detail with reference to the attached drawings.

Figure 1:
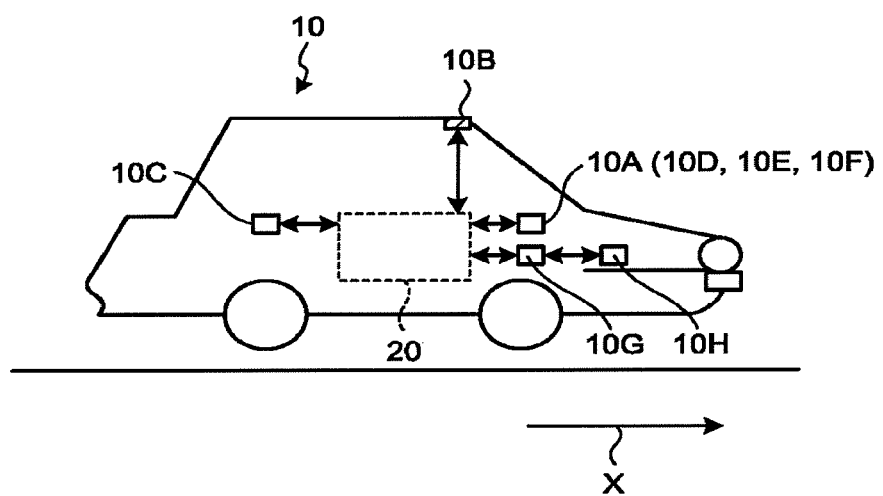
FIG. 1 is a diagram illustrating an example of a mobile object.

FIG. 1 is a diagram illustrating an example of a mobile object 10 according to an embodiment.

The mobile object 10 includes an information processing device 20, an output unit 10A, a sensor 10B, an input device 10C, a power control unit 10G, and a power unit 10H.

The information processing device 20 searches for a route of the mobile object 10 (details will be described later). The information processing device 20 is, for example, a special-purpose or a general-purpose computer. In the present embodiment, described is a case in which the information processing device 20 is mounted on the mobile object 10 as an example.

The mobile object 10 is a movable object. The mobile object 10 is, for example, a vehicle (a motorcycle, an automobile, and a bicycle), a dolly, a robot, a ship, and a flying object (an airplane, an unmanned aerial vehicle (UAV), and the like). The mobile object 10 is, for example, a mobile object that travels through a driving operation performed by a person, or a mobile object that can automatically travel (autonomously travel) without a driving operation performed by a person. The mobile object that can automatically travel is, for example, an automatic driving vehicle. The mobile object 10 according to the present embodiment is described as a vehicle that can autonomously travel as an example.

The information processing device 20 is not necessarily mounted on the mobile object 10. The information processing device 20 may be mounted on a stationary object. The stationary object is an unmovable object or an object stabilized on the ground. The stationary object is, for example, a guardrail, a pole, a parked vehicle, and a road sign. The information processing device 20 may be mounted on a cloud server that executes processing on a cloud.

The output unit 10A outputs various pieces of information. In the present embodiment, the output unit 10A outputs output information.

The output unit 10A has, for example, a communication function for transmitting the output information, a display function for displaying the output information, and a sound outputting function for outputting a sound indicating the output information. For example, the output unit 10A includes a communication unit 10D, a display 10E, and a speaker 10F.

The communication unit 10D communicates with an external device. The communication unit 10D is a VICS (registered trademark) communication circuit or a dynamic map communication circuit. The communication unit 10D transmits the output information to the external device. The communication unit 10D receives road information and the like from the external device. The road information includes a traffic light, a sign, surrounding buildings, a width of each lane, a center line of a lane, and the like. The road information may be stored in a storage unit 205.

The display 10E displays the output information. The display 10E is, for example, a known liquid crystal display (LCD), a projection device, and a light. The speaker 10F outputs a sound indicating the output information.

The sensor 10B is a sensor that acquires a traveling environment of the mobile object 10. The traveling environment is, for example, observation information of the mobile object 10 and peripheral information of the mobile object 10. The sensor 10B is, for example, an outer field sensor or an inner field sensor.

The inner field sensor is a sensor that observes the observation information. The observation information is information including at least acceleration of the mobile object 10. Specifically, the observation information includes at least one of the acceleration of the mobile object 10, speed of the mobile object 10, and angular speed of the mobile object 10.

The inner field sensor is, for example, an inertial measurement unit (IMU), an acceleration sensor, a speed sensor, and a rotary encoder. The IMU observes the observation information including triaxial acceleration and triaxial angular speed of the mobile object 10.

The outer field sensor observes the peripheral information of the mobile object 10. The outer field sensor may be mounted on the mobile object 10, or may be mounted outside the mobile object 10 (for example, another mobile object or an external device).

The peripheral information is information indicating a condition of surroundings of the mobile object 10. The surroundings of the mobile object 10 are a region within a predetermined range around the mobile object 10. This range is a range that can be observed by the outer field sensor. The range may be set in advance.

For example, the peripheral information is at least one of a photographed image of the surroundings of the mobile object 10 and distance information. The peripheral information may include location information of the mobile object 10. The photographed image is photographed image data obtained by photography (hereinafter, simply referred to as a photographed image in some cases). The distance information is information indicating a distance from the mobile object 10 to an object. The object is a point that can be observed by the outer field sensor in an outer field. The location information may be a relative position or an absolute position.

The outer field sensor is, for example, a photographing device that obtains the photographed image by photography, a distance sensor (a millimetric wave radar, a laser sensor, and a distance image sensor), and a position sensor (Global Navigation Satellite System (GNSS), a Global Positioning System (GPS), and a wireless communication device).

The photographed image is, for example, digital image data in which a pixel value is defined for each pixel, and a depth map in which a distance from the sensor 10E is defined for each pixel. The laser sensor is, for example, a two-dimensional Laser Imaging Detection and Ranging (LIDAR) sensor arranged in parallel with a horizontal plane, and a three-dimensional LIDAR sensor.

The input device 10C receives various instructions and an input of information from a user. The input device 10C is, for example, a pointing device such as a mouse and a trackball, or an input device such as a keyboard. The input device 10C may be an input function of a touch panel that is arranged integrally with the display 10E.

The power control unit 10G controls the power unit 10H. The power unit 10H is a device that is for driving and mounted on the mobile object 10. The power unit 10H is, example, an engine, a motor, and a wheel.

The power unit 10H is driven by being controlled by the power control unit 10G. For example, the power control unit 10G determines a condition of the surroundings on the basis of the output information generated by the information processing device 20, information obtained from the sensor 10B, and the like, and controls an accelerator quantity, a brake quantity, a steering angle, and the like. For example, the power control unit 10G controls the power unit 10H of the mobile object 10 so that the mobile object 10 moves along a route generated by the information processing device 20.

Figure 2:
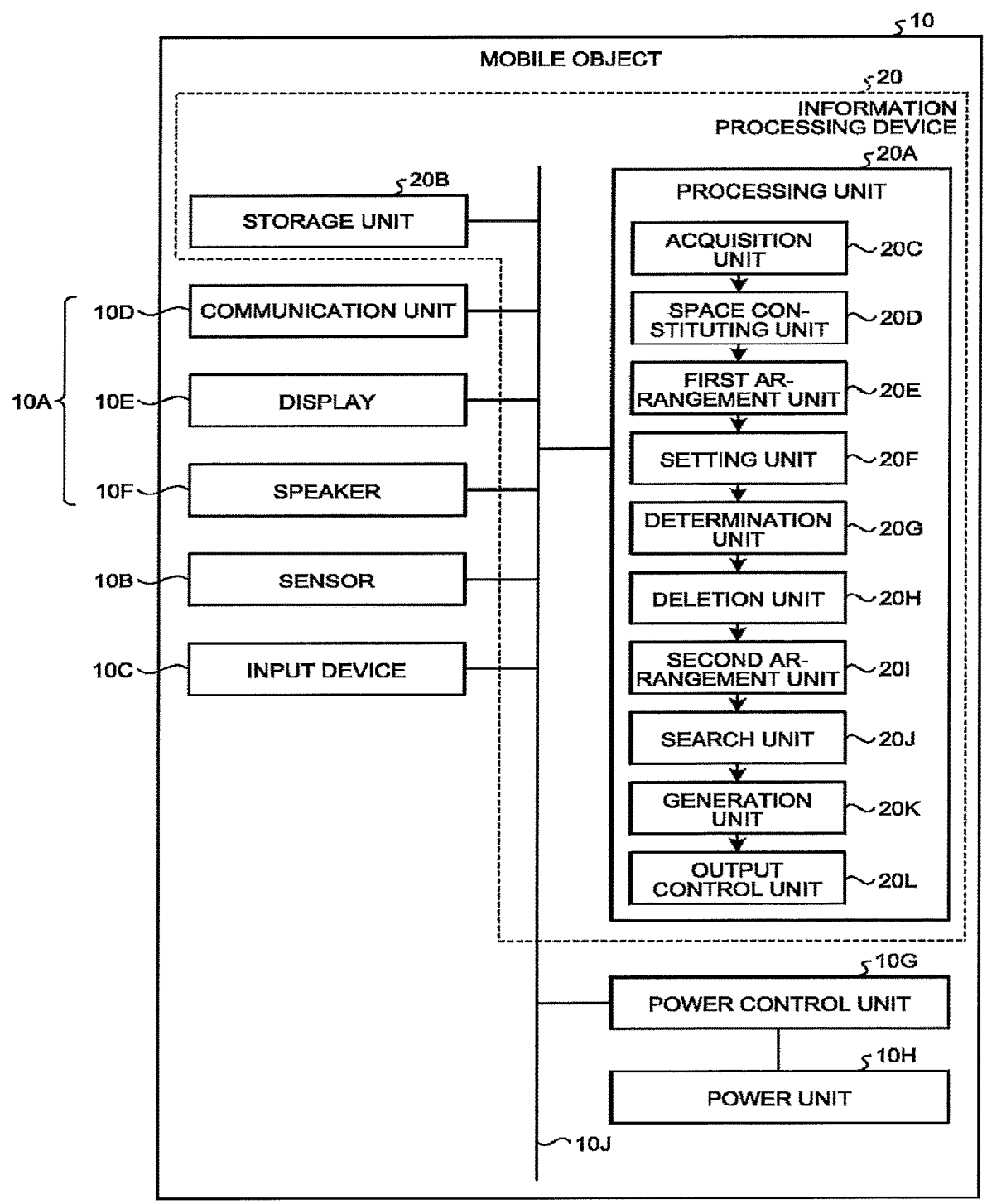
FIG. 2 is a block diagram illustrating an example of the mobile object.

Next, the following describes an electrical configuration of the mobile object 10 in detail. FIG. 2 is a block diagram illustrating an example of the configuration of the mobile object 10.

The mobile object 10 includes the information processing device 20, the output unit 10A, the sensor 10B, the input device 10C, the power control unit 10G, and the power unit 10H. As described above, the output unit 10A includes the communication unit 10D, the display 10E, and the speaker 10F.

The information processing device 20, the output unit 10A, the sensor 10B, the input device 10C, and the power control unit 10G are connected to each other via a bus 10J. The power unit 10H is connected to the power control unit 10G.

The information processing device 20 includes the storage unit 20B and a processing unit 20A. That is, the output unit 10A, the sensor 10B, the input device 10C, the power control unit 10G, and the storage unit 20B are connected to the processing unit 20A via the bus 10J.

At least one of the storage unit 20B, the output unit 10A (the communication unit 10D, the display 10E, and the speaker 10F), the sensor 10B, the input device 10C, and the power control unit 10G may be connected to the processing unit 20A in a wired or wireless manner. At least one of the storage unit 203, the output unit 10A (the communication unit 10D, the display 10E, and the speaker 10F), the sensor 10B, the input device 10C, and the power control unit 10G may be connected to the processing unit 20A via a network.

The storage unit 20B stores various pieces of data. The storage unit 20B may be, for example, a semiconductor memory element such as a random access memory (RAM) and a flash memory, a hard disk, and an optical disc. The storage unit 20B may be arranged outside the information processing device 20. The storage unit 20B may also be arranged outside the mobile object 10. For example, the storage unit 20B may be arranged in a server device installed on a cloud.

The storage unit 20B may be a storage medium. Specifically, the storage medium may be a storage medium that downloads a computer program or various pieces of information via a local area network (LAN) or the Internet to be stored or temporarily stored. The storage unit 20B may include a plurality of storage media.

The processing unit 20A includes an acquisition unit 20C, a space constituting unit 20D, a first arrangement unit 20E, a setting unit 20F, a determination unit 20G, a deletion unit 20H, a second arrangement unit 20I, a search unit 20J, a generation unit 20W, and an output control unit 20L.

Each processing function of the processing unit 20A is stored in the storage unit 20B as a computer program that can be executed by a computer. The processing unit 20A is a processor that implements a functional unit corresponding to each computer program by reading out the computer program from the storage unit 20B to be executed.

The processing unit 20A that has read out each computer program is assumed to have each functional unit illustrated in the processing unit. 20A of FIG. 2. With reference to FIG. 2, described is a case in which the acquisition unit 20C, the space constituting unit 20D, the first arrangement unit 20F, the setting unit 20F, the determination unit 20G, the deletion unit 20H, the second arrangement unit 20I, the search unit 20J, the generation unit 20W, and the output control unit 20L are implemented by the single processing unit 20A.

The processing unit 20A may be configured by combining a plurality of independent processors for implementing each of functions. In this case, each function is implemented when each processor executes the computer program. There may be a case in which each processing function is configured as a computer program and one processing circuit executes each computer program, and a case in which a specific function is mounted in a dedicated and independent program execution circuit.

A term "processor" used in the embodiment represents, for example, a circuit of a central processing unit (CPU), a graphical processing unit (GPU), an application specific integrated circuit (ASIC), or a programmable logic device (for example, a simple programmable logic device (SPLD), complex programmable logic device (CPLD), and a field programmable gate array (FPGA)).

The processor implements a function by reading out and executing the computer program stored in the storage unit 20P. Instead of storing the computer program in the storage unit 20D, the computer program may be directly embedded in a circuit of the processor. In this case, the processor implements the function by reading out and executing the computer program embedded in the circuit.

The acquisition unit 20C acquires a scheduled traveling route. The scheduled traveling route is a route over which the mobile object 10 is scheduled to pass when moving from a certain point to another point. For example, the scheduled traveling route is a route over which the mobile object 10 is scheduled to pass when moving from a present location to a destination.

Specifically, the scheduled traveling route is constituted of a line passing over a road over which the mobile object 10 passes when moving from a certain point (for example, the present location of the mobile object 10) to another point (for example, the destination), and a line connecting between lines passing over different roads. The line passing over the road is, for example, a line passing through the center of the road to be passed (the center of a lane along a traveling direction). The line connecting between lines passing over different roads is, for example, a line that connects an end of a line passing over one of the roads and an end of a line passing over the other one of the roads such that a curvature draws a certain arc.

The scheduled traveling route may further include identification information of the road to be passed (hereinafter, referred to as a road ID in cases) and speed information indicating recommended speed of the mobile object 10.

Figure 3:
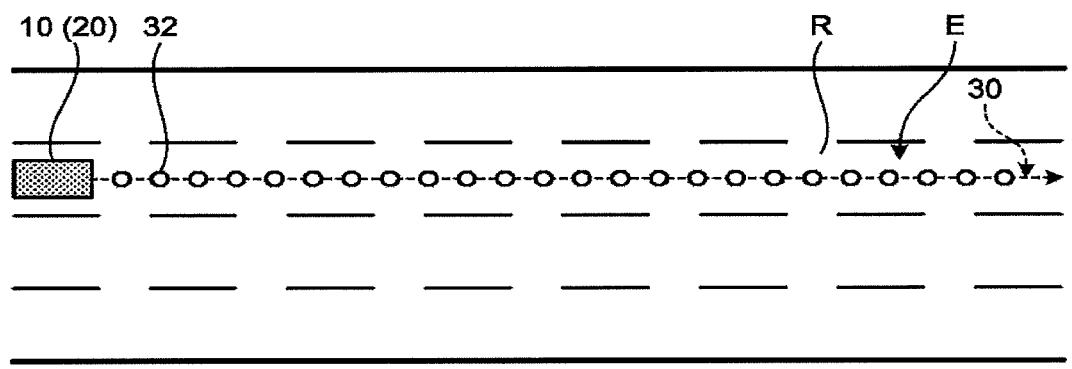
FIG. 3 is a schematic diagram illustrating an example of a scheduled traveling route.

FIG. 3 is a schematic diagram illustrating an example of the scheduled traveling route 30. The scheduled traveling route 30 is represented by a line passing through the center of a traveling possible region E of a road R. The traveling possible region E is a region in which the mobile object 10 can travel. The traveling possible region E is, for example, a region along the lane on which the mobile object 10 travels.

In the present embodiment, described is a case in which the scheduled traveling route 30 is represented by a group of a plurality of reference points 32 (hereinafter, referred to as a way point (WP) 32). The WP 32 is a point defining a position and at least one of scheduled passing time and scheduled passing speed of the mobile object 10. The WP 32 may be represented by a vector in place of the point.

The position defined by the WP 32 indicates a position on a map. The position is, for example, represented by world coordinates. The position may be represented as a relative position with respect to the present position of the mobile object 10.

The scheduled passing time defined by the WP 32 represents time at which the mobile object 10 is scheduled to pass through the position of the WP 32. The scheduled passing time may be relative time with respect to specific time, or time corresponding to a standard time and frequency signal.

The scheduled passing speed defined by the WP 32 represents scheduled speed at the time when the mobile object 10 passes through the position of the WP 32. The scheduled passing speed may be relative speed with respect to specific speed, or may be absolute speed.

Returning to FIG. 2, the description will be continued. The space constituting unit 20D arranges the scheduled traveling route 30 and the object in a search space.

Figure 4:
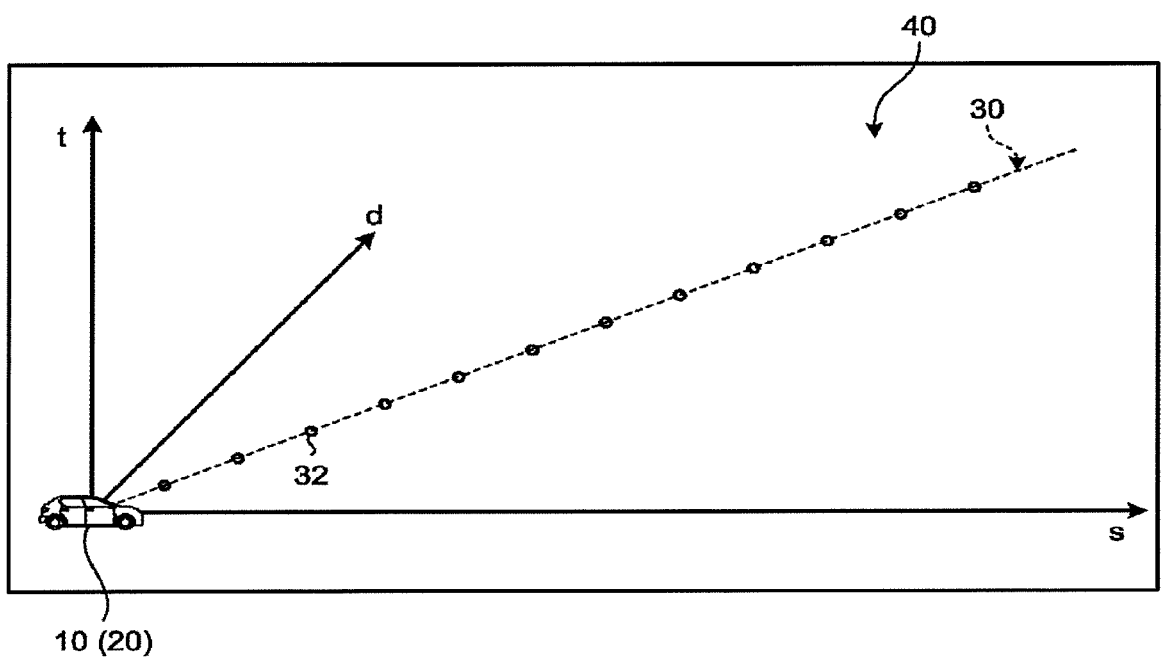
FIG. 4 is a schematic diagram illustrating a search space.

FIG. 4 is a schematic diagram illustrating a search space 40. The search space 40 is a space represented by a two-dimensional coordinate space (sd coordinate space), and a scheduled passing time axis (t) or a scheduled passing speed axis (v) orthogonal to the two-dimensional coordinate space. FIG. 4 illustrates the scheduled passing time axis (t) as an example of the coordinate axis orthogonal to the two-dimensional coordinate space.

The two-dimensional coordinate space is a space of a two-dimensional plane along the traveling possible region E (refer to FIG. 3) of the mobile object 10 moving on the scheduled traveling route 30. The two-dimensional coordinate space is defined with an s-axis along a direction following the road of the mobile object 10 and a d-axis along a vehicle width direction of the mobile object 10. The s-axis and the d-axis are arranged to be orthogonal to each other. The s-axis is identical to an extending direction of the scheduled traveling route 30. The vehicle width direction is a direction orthogonal to the traveling direction of the mobile object 10.

The scheduled passing time axis (t) orthogonal to the two-dimensional coordinate space (sd coordinate space) is a coordinate axis indicating the scheduled passing time of the mobile object 10.

As described above, the search space 40 may be represented by using the scheduled passing speed axis (v) as a coordinate axis in place of the scheduled passing time axis (t).

The space constituting unit 20D may generate the search space 40 in accordance with content defined by the WP 32 constituting the scheduled traveling route 30.

For example, the TOP 32 constituting the scheduled traveling route 30 is assumed to define the position and the scheduled passing time. In this case, the space constituting unit 20D may generate the search space 40 using the two-dimensional coordinate space (sd coordinate space) and the scheduled passing time axis (t) as coordinate axes. For example, the WP 32 constituting the scheduled traveling route 30 is assumed to define the position and the scheduled passing speed. In this case, the space constituting unit 20D may generate the search space 40 using the two-dimensional coordinate space (sd coordinate space) and the scheduled passing speed axis (v) as the coordinate axes.

Next, the space constituting unit 20D arranges the scheduled traveling route 30 in the search space 40. For example, the space constituting unit 20D arranges each WP 32 at the position indicated by the WP 32 constituting the scheduled traveling route 30, that is, a point corresponding to the scheduled traveling route 30. The position defined by the WP 32 may be represented by world coordinates in some cases. In this case, the space constituting unit 20D may convert the position coordinates represented by world coordinates and defined by the WP 32 into position coordinates represented by the sd coordinate space, and may arrange the position coordinates in the search space 40.

The space constituting unit 20D may represent the search space 40 using an xy coordinate space or an xyz coordinate space of world coordinates in place of the sd coordinate space. In this case, the xy coordinate space is a two-dimensional plane orthogonal to a Z-axis direction indicating a vertical direction (height).

Figure 5A:
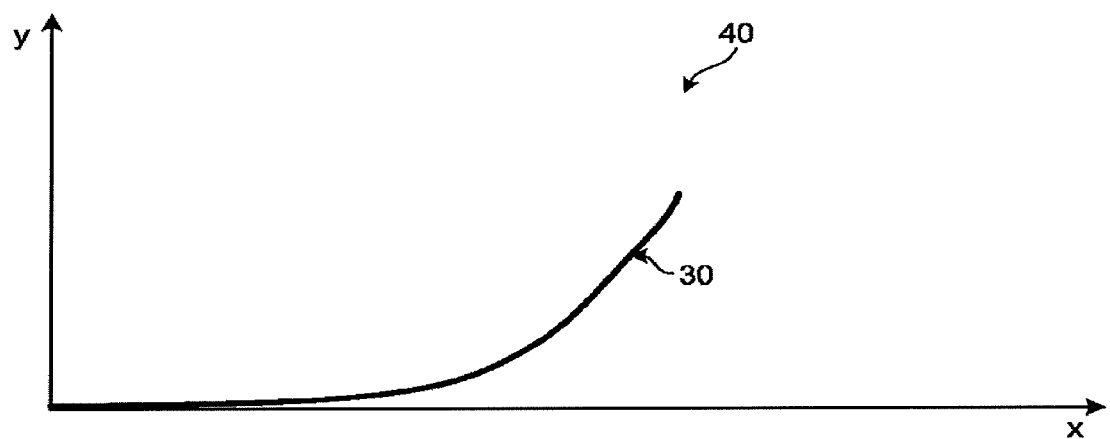
FIGS. 5A and 5B are explanatory diagrams of the search space.
Figure 5B:
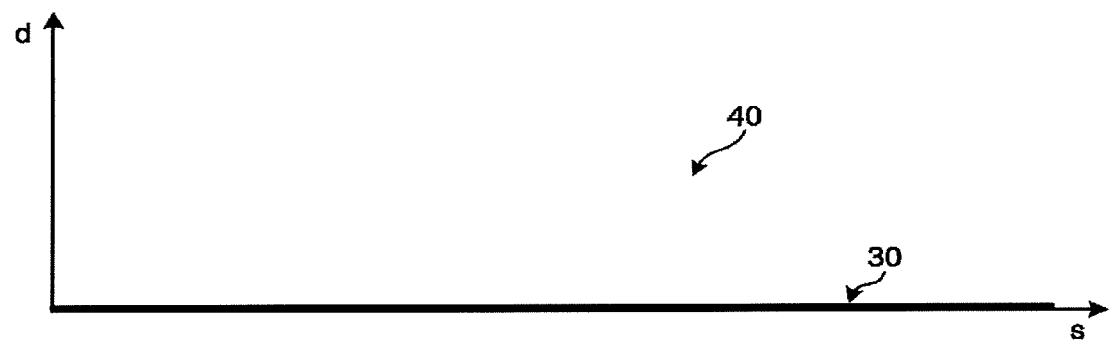

FIGS. 5A and 5B are explanatory diagrams representing the two-dimensional coordinate space of the search space 40 using each of the xy coordinate space and the sd coordinate space respectively. FIG. 5A is an example of representing the two-dimensional coordinate space of the search space 40 with the xy coordinate space, and arranging the scheduled traveling route 30 therein. FIG. 5B is an example of representing the two-dimensional coordinate space of the search space 40 with the sd coordinate space, and arranging the scheduled traveling route 30 therein.

Returning to FIG. 2, the description will be continued. The space constituting unit 20D further arranges an object in the search space 40.

Figure 6A:
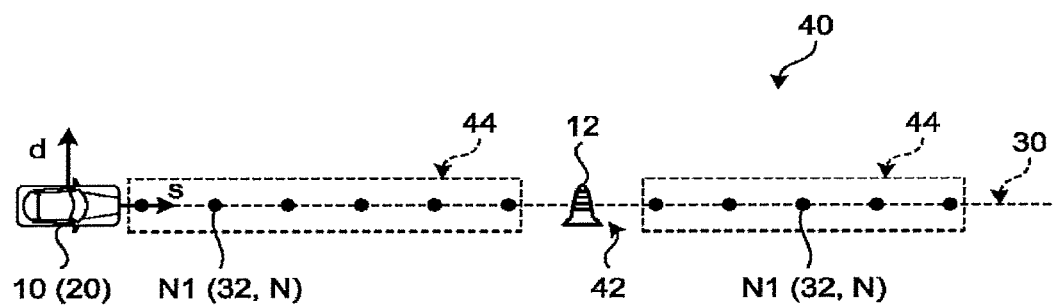
FIGS. 6A and 6B are explanatory diagrams of arrangement of an object in the search space.
Figure 6B:
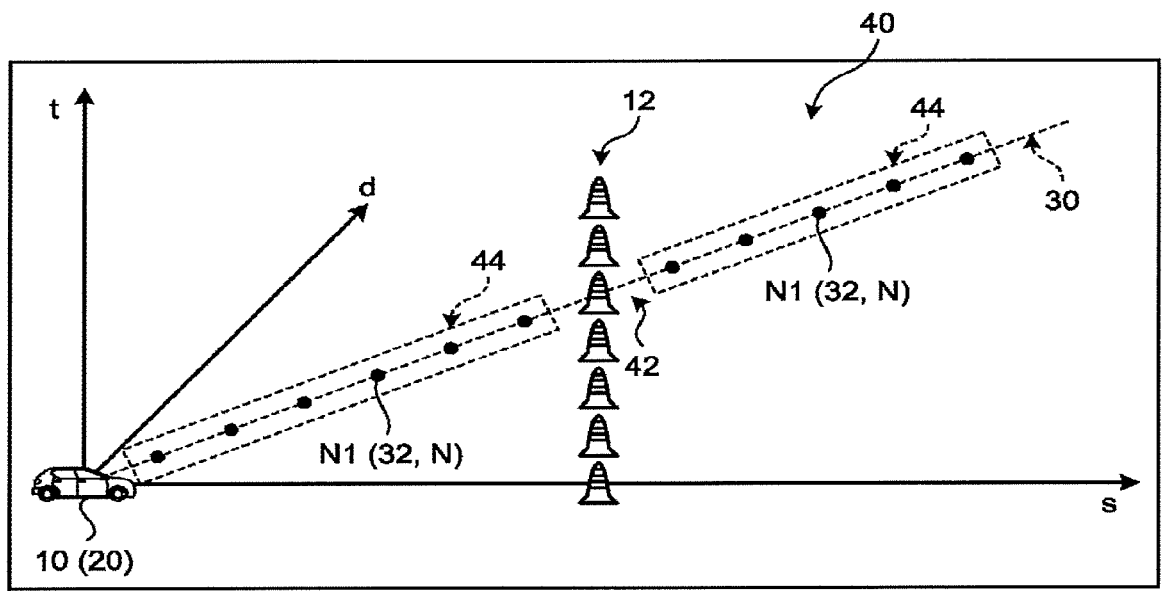

FIGS. 6A and 6B are explanatory diagrams of arrangement of an object 12 in the search space 40. FIG. 6A is an example of representing the search space 40 with the two-dimensional coordinate space (ad coordinate space). FIG. 6B is an example of representing the search space 40 with a three-dimensional space (sdt coordinate space).

The object 12 is a thing that possibly obstructs traveling of the mobile object 10. The object 12 is, for example, an obstacle. The obstacle is another mobile object, a living thing such as a person and a tree, a non-living thing arranged on the ground (for example, various objects such as a sign, a traffic light, and a guardrail), and the like. The object 12 is not limited to the obstacle. For example, the object 12 may be a non-obstacle. The non-obstacle is a region in which a road surface is deteriorated in the traveling possible region E. The region in which a road surface is deteriorated is, for example, a puddle and a depressed region. The non-obstacle may be a traveling-prohibited region. The traveling-prohibited region is a region in which traveling is prohibited represented by a rule of the road. The traveling-prohibited region is, for example, a region defined by a sign of no passing.

For example, the space constituting unit 20D acquires information for specifying the object 12 from the acquisition unit 20C. In the present embodiment, the space constituting unit 203 acquires information indicating a position, a size, and a shape of the object 12 in a real space. The space constituting unit 20D may acquire information indicating the position of the object 12 in the real space and a region occupied by the object 12 in the real space.

For example, the space constituting unit 20D acquires information indicating the position, the size, and the shape of the object 12 from the sensor 10B via the acquisition unit 20C. In this case, the acquisition unit 20C derives the information indicating the position, the size, and the shape of the object 12 using a known method with a sensing result obtained by the sensor 10B. The space constituting unit 20D may derive the information indicating the position, the size, and the shape of the object 12 from the acquisition unit 20C.

The space constituting unit 20D then arranges the object 12 in the search space 40 (refer to FIGS. 6A and 6B).

Returning to FIG. 2, the description will be continued. Next, the following describes the first arrangement unit 20E. The first arrangement unit 20E arranges a node. The node is a point used for searching for a route (to be described later). The information processing device 20 searches for the route by searching for a plurality of routes connecting plurality of nodes toward a traveling direction (details will be described later).

The following description uses FIGS. 6A and 6B.

In the present embodiment, the first arrangement unit 20E arranges a node N in a first region 44 of the scheduled traveling route 30. That is, the first arrangement unit 20E arranges the node N in the first region 44 of the search space 40.

The first region 44 is a region not interfering with the object 12 on the scheduled traveling route 30. In other words, the first region 44 is a region other than an interference region 42 interfering with the object 12 on the scheduled traveling route 30.

Interfering with the object 12 means that, when the mobile object 10 is assumed to travel along the scheduled traveling route 30, the mobile object 10 is brought into contact with the object 12 or travels over the object 12.

For example, the space constituting unit 20D sets, as the node N, the WP 32 arranged in the first region 44 as region other than the interference region 42 among a plurality of WPs 32 constituting the scheduled traveling route 30. Due to this, among the WPs 32 constituting the scheduled traveling route 30, the WP 32 arranged in the first region 44 other than the interference region 42 is set as the node N. In the following description, the node N arranged by the first arrangement unit 20E is referred to as a node N1.

Returning to FIG. 2, the description will be continued. Next, the following describes the setting unit 20F. The setting unit 20F sets a potential field in the search space 40.

FIGS. 7A to 7D are explanatory diagrams of an example of a potential field 43. In FIGS. 7A to 7D, the two-dimensional coordinate space (sd coordinate space) of the search space 40 is illustrated, and a p-axis indicating the potential field 43 is illustrated as a coordinate axis orthogonal to the two-dimensional coordinate space.

The potential field 43 defines a potential value of each point in the search space 40. The potential value represents a risk of raveling. That is, the setting unit 20F sets a higher potential value to a point where the risk of traveling is higher, and sets a lower potential value to a point where the risk of traveling is lower.

In the present embodiment, the setting unit 20F sets the potential field indicating a lower potential value as being closer to the scheduled traveling route 30 or more distant from the object 12.

In particular, the setting unit 20F forms a potential line L constituted of a group of potential values in the search space 40. Specifically, the setting unit 20F defines a high potential value in a region occupied by the object 12 in the search space 40.

Figure 7A:
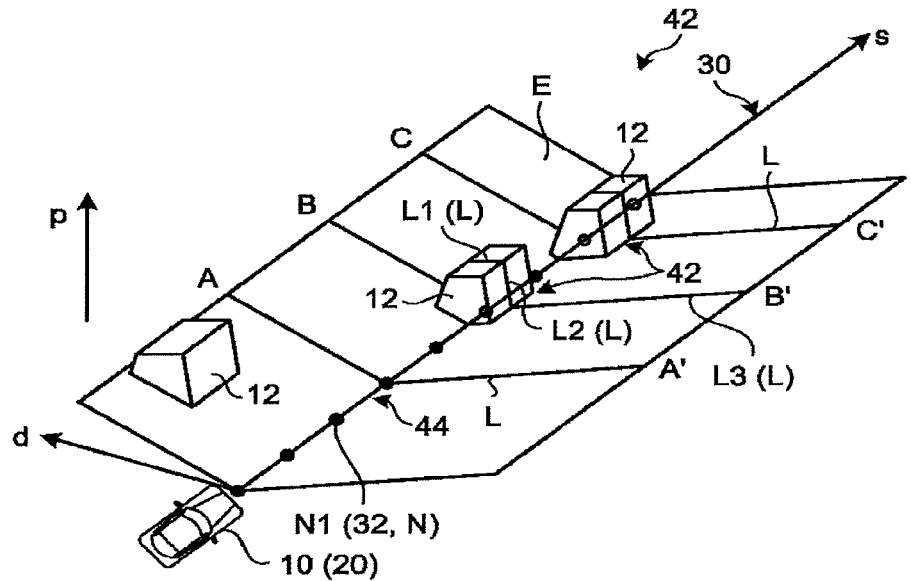
FIGS. 7A to 7D are explanatory diagrams of an example of a potential field.

For example, as illustrated in FIG. 7A, the setting unit 20F sets the potential line L indicating the potential value in the search space 40.

Specifically, the setting unit 20F first defines the lowest potential value in the first region 44 not interfering with the object 12 on the scheduled traveling route 30 arranged in the search space 40. This is because the scheduled traveling route 30 is a line passing through the center of the traveling possible region E of the road R, and because the region on the scheduled traveling route 30 in which the object 12 is not present hardly deviates from the traveling possible region E.

Next, the setting unit 20F sets a potential value higher than that of the scheduled traveling route 30 in the region occupied by the object 12. For example, the setting unit 20I forms a first line L1 indicating a higher potential value than that of the scheduled traveling route 30 and extending in a d-axis direction in the region occupied by the object 12.

The setting unit 20F then forms a second line L2 the potential value of which lowers with a first gradient from both ends in the d-axis direction of the first line L1 toward the outside of the object 12.

The setting unit 20F forms a third line L3 the potential value of which increases with a third gradient from the scheduled traveling route 30 toward both ends in the d-axis direction of the traveling possible region E for example, road shoulders).

The gradient of the second line L2 is preferably larger than the gradient of the third line L3. This is because the mobile object 10 is preferably prevented from taking a wide turn to avoid the object 12 at the time of traveling.

The gradient of the second line L2 is an angle formed by a straight line parallel with the d-axis and the first line L1. The gradient of the third line L3 is an angle formed by the straight line parallel with the d-axis and the third line L3. The gradients of the second line L2 and the third line L3 may be set in advance by the user. Each of the gradients may be a value corresponding to a side distance between the object 12 and the mobile object 10 at the time when the mobile object 10 travels and passes the object 12. For example, the setting unit 20F may set the gradients so that the gradients of the second line L2 and the third line L3 are reduced as the side distance increases. The side distance may be set in advance by the user.

At least one of the first line L1, the second line L2, and the third line L3 may be a straight line the gradient of which is fixed, or a curved line the gradient of which varies.

The setting unit 20F forms the potential line L by connecting the first line L1, the second line L2, and the third line L3 to each other from the WP 32 toward both ends in the d-axis direction of the traveling possible region E for each WP 32 constituting the scheduled traveling route 30. In a region not overlapping with the object 12 on the scheduled traveling route 30, the potential line L is formed by a pair of third lines L3 extending from the WP 32 toward both ends in the d-axis direction of the traveling possible region E. In this way, the setting unit 20F sets the potential field 43 by forming the potential line L.

Next, the setting unit 20F specifies a local minimum point 34 in the search space 40. The local minimum point 34 is a point indicating a local minimum peak of the potential value indicated by the potential field 43.

Figure 7B:
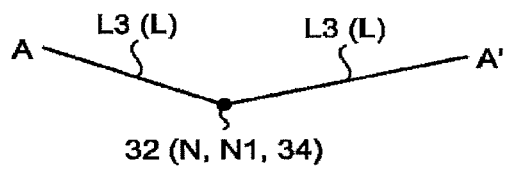
Figure 7C:
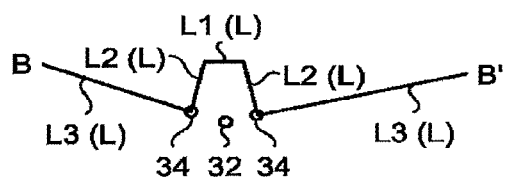
Figure 7D:
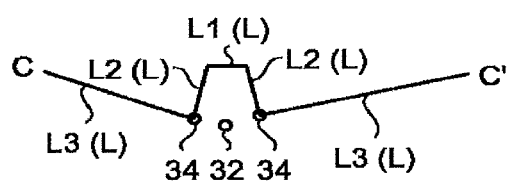

FIGS. 7B to 7D illustrate a cross section obtained by cutting the potential field 43 of the search space 40 illustrated in FIG. 7A along a two-dimensional plane formed by the p-axis and the d-axis. FIG. 7I is an A-A' cross section of FIG. 7A. FIG. 7C is a B-B' cross section of FIG. 7A. FIG. 7O is a C-C' cross section of FIG. 7A.

As illustrated in FIG. 7B, in the cross section (A-A' cross section) including the first region 44 not interfering with the object 12 on the scheduled traveling route 30, the position of the WP 32 is the local minimum point 34.

As illustrated in FIGS. 7C and 7D, in the interference region 42 interfering with the object 12 on the scheduled traveling route 30, each position shifted from the WP 32 toward both ends in the d-axis direction is the local minimum point 34. That is, on the potential line L interfering with the object 12, a plurality of local minimum points 34 are present to avoid the object 12.

Figure 8A:
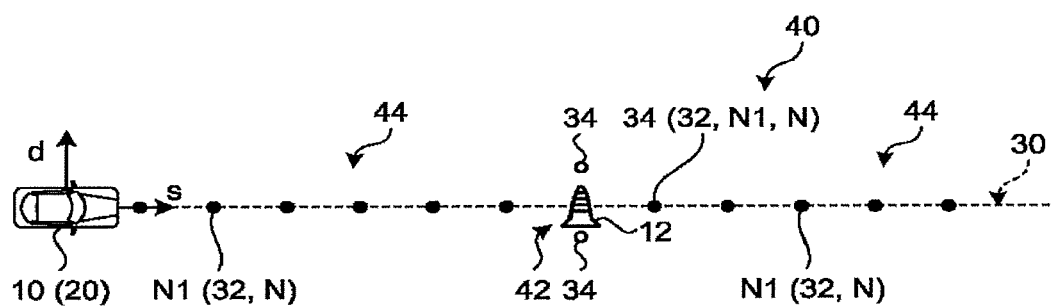
FIGS. 8A and 8B are schematic diagrams of arrangement of a local minimum point in the search space.
Figure 8B:
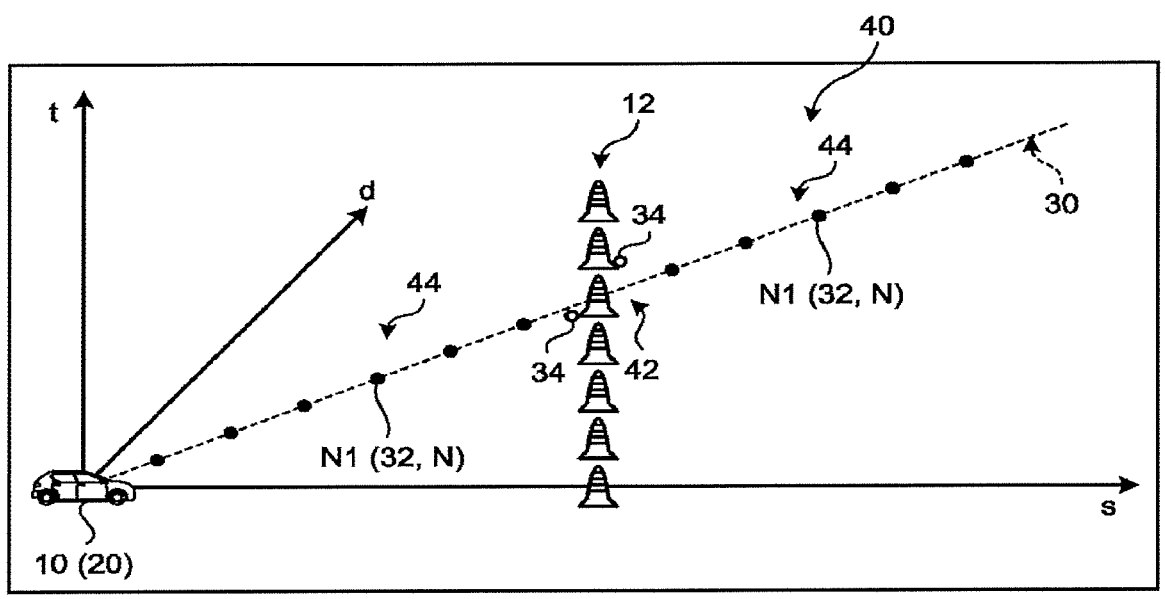

The setting unit 20F then arranges the local minimum point 34 in the search space 40. FIGS. 8A and 8B are schematic diagrams illustrating an example of a state in which the local minimum point 34 is arranged in the search space 40. FIG. 8A is an example of representing the search space 40 as the two-dimensional coordinate space (sd coordinate space). FIG. 8B is an example of representing the search space 40 as the three-dimensional space (sdt coordinate space).

As illustrated in FIGS. 8A and 8B, the local minimum point 34 is arranged at a local minimum peak of the potential value of the risk of traveling in the search space 40. Thus, in the interference region 42 interfering with the object 12 on the scheduled traveling route 30, the local minimum point 34 is arranged at a position avoiding the object 12 and where the risk of traveling is low.

In the present embodiment, described is a case in which the object 12 is an immovable object as an example. FIGS. 8A and 8B illustrate a case in which one object 12 is present on the scheduled traveling route 30 as an example. Accordingly, the position of the object 12 is fixed irrespective of scheduled passing time (t). When the object 12 is a movable object, a position corresponding to the scheduled passing time (t) varies. In this case, the setting unit 20F may generate the potential field 43 for each scheduled passing time (t), and set the local minimum point 34 at a position not interfering with the moving object 12.

Returning to FIG. 2, the description will be continued. The determination unit 20G determines a region to which the node N is added. That is, the determination unit 20G determines a region in which the node N is additionally arranged in addition to the node N1 arranged by the first arrangement unit 20E. In the following description, for convenience of explanation, the node N to be additionally arranged is referred to as a node N2.

Figure 9:
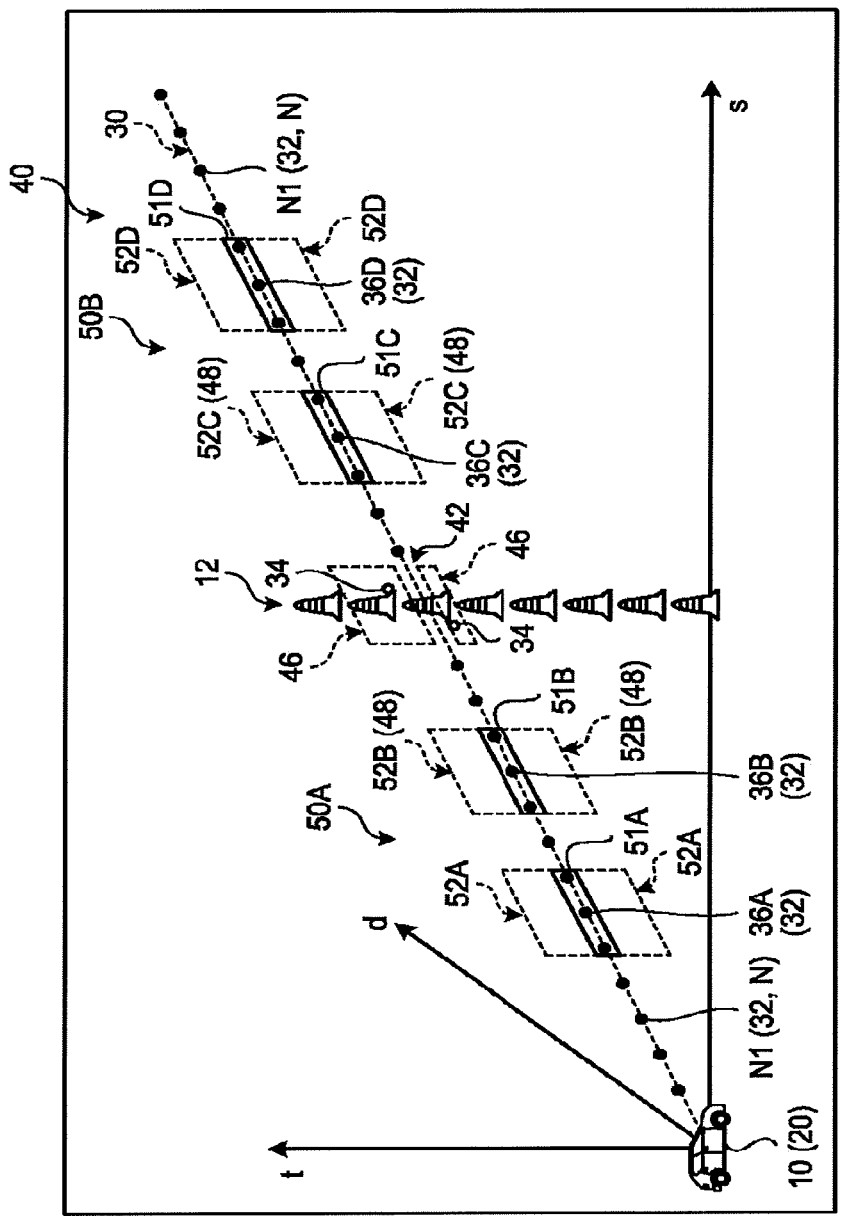
FIG. 9 is an explanatory diagram of a region to which a node is added.

FIG. 9 is an explanatory diagram of an object a region to which the node N2 is added. The determination unit 20G determines the local minimum point 34, a second region 46, and a third region 48 to be regions to which the node N2 is additionally arranged.

In FIG. 9, the second region 46 and the third region 48 are separately present. Alternatively, a deviation start scheduled space 51B and a deviation end scheduled space 51C (described later) may be taken to be long, and the second region 46 and the third region 48 may be caused to be one large region.

The second region 46 is a region around the interference region 42 interfering with the object 12. The second region 46 is a region in the search space 40. The second region 46 is a region deviating from the scheduled traveling route 30, and is a region around the interference region 42. More specifically, the second region 46 is a region deviating from the scheduled traveling route 30, a region around the interference region 42, and a peripheral region around the local minimum point 34.

Specifically, the second region 46 is a region including the local minimum point 34. The second region 46 is a space different from the object 12 interfering with the scheduled traveling route 30 in at least one of the position in the two-dimensional coordinate space (sd coordinate space and the scheduled passing time (t) or the scheduled passing speed (v), in the search space 40.

The search space 40 is assumed to define the scheduled passing time (t) as a coordinate axis orthogonal to the sd coordinate space. In this case, the determination unit 20G may determine a space including the local minimum point 34 and different from the object 12 interfering with the scheduled traveling route 30 in the position in the two-dimensional coordinate space (sd coordinate space) and the scheduled passing time (t) to be the second region 46.

The search space 40 is assumed to define the scheduled passing speed as a coordinate axis orthogonal to the sd coordinate space. In this case, the determination unit 20G may determine a space including the local minimum point 34 and different from the object 12 interfering with the scheduled traveling route 30 in the position in the two-dimensional coordinate space (sd coordinate space) and the scheduled passing speed (v) to be the second region 46.

The third region 48 is a region deviating from the scheduled traveling route 30 in at least one of a space before interference 50A and a space after interference 50B, in the search space 40.

The space before interference 50A is a space before the scheduled passing time at which the scheduled traveling route 30 interferes with the object 12 or the scheduled passing speed (v) at the position where the scheduled traveling route 30 interferes with the object 12, in the search space 40.

The space after interference 50B is a space after the scheduled passing time at which the scheduled traveling route 30 interferes with the object 12 or the scheduled passing speed (v) at the position where the scheduled traveling route 30 interferes with the object 12, in the search space 40.

The region deviating from the scheduled traveling route 30 indicates a region different from the scheduled traveling route 30 in the search space 40 in at least one of the position in the two-dimensional coordinate space (sd coordinate space) and the scheduled passing time (t) or the scheduled passing speed (v).

In the present embodiment, determination unit 20G determines a specific region in the space before interference 50A to be the third region 48. The determination unit 20G determines a specific region in the space after interference 50B to be the third region 48.

Specifically, the determination unit 20G determines region around at least one of an acceleration/deceleration start scheduled space 51A and the deviation start scheduled space 51B and deviating from the scheduled traveling route 30 in the space before interference 50A to be the third region 48.

The acceleration/deceleration start scheduled space 51A is a space in which the mobile object 10 traveling on the scheduled traveling route 30 starts acceleration/deceleration before interfering with the object 12, on the scheduled traveling route 30 in the space before interference 50A. For example, the storage unit 20B stores, in advance, information for specifying the WP 32 at which acceleration/deceleration is to be started to avoid the object 12.

The information for specifying the WP 32 at which acceleration/deceleration is started may be stored, for example, in the storage unit 20B in advance through an operation of the input device 10C performed by the user. The information for specifying the WP 32 at which acceleration/deceleration is started may be represented by a distance from the object 12, for example.

For example, the storage unit 20B stores in advance a look-up table associating the speed of the mobile object 10 with the information for specifying the WP 32 at which acceleration/deceleration is started. In place of the speed of the mobile object 10, time required for avoiding the object 12 until the avoidance is ended and an avoiding method (slowly avoiding, quickly avoiding) may be registered in the look-up table. The determination unit 20C may acquire the information for specifying the WP 32 at which acceleration/deceleration is started by reading, from the look-up table, the information for specifying the WP 32 at which acceleration/deceleration is started corresponding to current speed per hour. The determination unit 20G may acquire the information for specifying the WP 32 at which acceleration/deceleration is started by reading, from the look-up table, the information for specifying the WP 32 at which acceleration deceleration is started corresponding to the required time or the avoiding method input by the user.

For example, an acceleration/deceleration starting point 36A illustrated in FIG. 9 is assumed to be used as the information indicating the WP 32 at which acceleration/deceleration is started. In this case, the determination unit 20G specifies, as the acceleration/deceleration start scheduled space 51A, the acceleration/deceleration starting point 36A on the scheduled traveling route 30 and a predetermined number of (for example, two) WPs 32 adjacent to the acceleration/deceleration starting point 36A. The determination unit 20G then determines a region 52A around the acceleration/deceleration start scheduled space 51A on the scheduled traveling route 30 in the space before interference 50A to be the third region 48.

The region 52A around the acceleration/deceleration start scheduled space 51A is different from the acceleration/deceleration start scheduled space 51A in the search space 40 in at least one of the position in the two-dimensional coordinate space (sd coordinate space) and the scheduled passing time (t) or the scheduled passing speed (v).

The deviation start scheduled space 51B is a space in which the mobile object 10 that has traveled on the scheduled traveling route 30 starts to deviate from the scheduled traveling route 30 to avoid the object 12 on the scheduled traveling route 30 in the space before interference 50A. For example, the storage unit 20B stores, in advance, the information for specifying the WP 32 that starts to deviate from the scheduled traveling route 30 to avoid the object 12. The information may be, for example, stored in the storage unit 20B in advance through an operation of the input device 10C by the user. The information may be represented by a distance from the object 12, for example.

For example, the storage unit 20B stores, in advance, the look-up table associating the speed of the mobile object 10 with the information for specifying the WP 32 at which deviation from the scheduled traveling route 30 is started. In place of the speed of the mobile object 10, the time required for avoiding the object 12 until the avoidance is ended or the avoiding method (slowly avoiding, quickly avoiding) may be registered in the look-up table. The determination unit 20G may acquire information for specifying the WP 32 at which deviation from the scheduled traveling route 30 is started by reading, from the look-up table, the information for specifying the WP 32 at which deviation from the scheduled traveling route 30 is started corresponding to the current speed per hour. The determination unit 20G may acquire the information for specifying the WP 32 at which deviation from the scheduled traveling route 30 is started by reading, from the look-up table, the information for specifying the WP 32 at which deviation from the scheduled traveling route 30 is started corresponding to the required time or the avoiding method input by the user.

For example, a deviation starting point 36B illustrated in FIG. 9 is assumed to be used as the information indicating the WP 32 at which deviation is started. In this case, the determination unit 20G specifies the deviation starting point 36B and a predetermined number of (for example, two in total) WPs 32 adjacent to the deviation starting point 36B on the scheduled traveling route 30 as the deviation start scheduled space 31B. The determination unit 20G determines a region 52B around the deviation start scheduled space 51B on the scheduled traveling route 30 in the space before interference 50A to be the third region 48.

The region 52B around the deviation start scheduled space 51B is different from the deviation start scheduled space 51B in the search space 40 in at least one of the position in the two-dimensional coordinate space (sd coordinate space) and the scheduled passing time (t) or the scheduled passing speed (v).

FIG. 9 illustrates an example of a case in which the region 52B around the deviation start scheduled space 51B is determined to be the third region 48. The determination unit 20G may determine at least one of the region 52A and the region 52B in the space before interference 50A to be the third region 48. Thus, the determination unit 20G is not limited to a form of determining the region 52B to be the third region 48.

The determination unit 20G also determines a region that is present around at least one of the deviation end scheduled space 51C and an acceleration/deceleration end scheduled space 51B in the space after interference 50B, and deviates from the scheduled traveling route 30 to be the third region 48.

The deviation end scheduled space 51C is a space in which the mobile object 10 deviating from the scheduled traveling route 30 ends the deviation on the scheduled traveling route 30 in the space after interference 50B. For example, the storage unit 20B stores, in advance, information for specifying the WP 32 at which the mobile object 10 deviating from the scheduled traveling route 30 for avoiding the object 12 ends the deviation. This information may be stored in the storage unit 20B in advance through an operation of the input device 10C performed by the user, for example. This information may be represented by a distance from the object 12, for example.

For example, the storage unit 20B stores, in advance, a look-u table associating the speed of the mobile object 10 with the information for specifying the WP 32 at which the deviation from the scheduled traveling route 30 is ended. In place of the speed of the mobile object 10, the time required for avoiding the object 12 until the avoidance is ended or the avoiding method (slowly avoiding, quickly avoiding) may be registered in the look-up table. The determination unit 20G may acquire the information for specifying the WP 32 at which the deviation from the scheduled traveling route 30 is ended by reading, from the look-up table, the information for specifying the WP 32 at which the deviation from the scheduled traveling route 30 is ended corresponding to the current speed per hour. The determination unit 20G may acquire the information for specifying the WP 32 at which the deviation from the scheduled traveling route 30 is ended by reading, from the look-up table, the information for specifying the WP 32 at which the deviation from the scheduled traveling route 30 is ended corresponding to the required time or the avoiding method input by the user.

For example, a deviation ending point 36C illustrated in FIG. 9 is assumed to be used as the information indicating the WP 32 at which the deviation is ended. In this case, the determination unit 20G determines the deviation ending point 36C and a predetermined number of (for example, two) WPs 2 adjacent to the deviation ending point 36C on the scheduled traveling route 30 to be the deviation end scheduled space 51C. The determination unit 20G then determines the region 52C around the deviation end scheduled space 51C on the scheduled traveling route 30 in the space after interference 50B to be the third region 48.

The region 52C of the deviation end scheduled space 51C is a region different from the deviation end scheduled space 51C in the search space 40 in at least one of the position in the two-dimensional coordinate space (sd coordinate space) and the scheduled passing time (t) or the scheduled passing speed (v).

The acceleration/deceleration end scheduled space 51C is a space for ending acceleration/deceleration executed before the mobile object 10 that has traveled on the scheduled traveling route 30 interferes with the object 12 on the scheduled traveling route 30 in the space after interference 50B. For example, the storage unit 20B stores, in advance, information for specifying the WP 32 at which acceleration/deceleration executed for avoiding the object 12 is ended. This information may be stored in the storage unit 20B in advance through an operation of the input device 10C performed by the user, for example. This information may be represented by a distance from the object 12, for example.

For example, the storage unit 20B stores, in advance, a look-up table associating the speed of the mobile object 10 with information for specifying the WP 32 at which acceleration/deceleration is ended. In place of the speed of the mobile object 10, the time required for avoiding the object 12 until the avoidance is ended or the avoiding method (slowly avoiding, quickly avoiding) may be registered in the look-up table. The determination unit 20G may acquire the information for specifying the WP 32 at which acceleration/deceleration is ended by reading, from the look-up table, the information for specifying the WP 32 at which acceleration/deceleration is ended corresponding to the current speed per hour. The determination unit 20G may acquire the information for specifying the WP 32 at which acceleration/deceleration is ended by reading, from the look-up table, the information for specifying the WP 32 at which acceleration/deceleration is ended corresponding to the required time or the avoiding method input by the user.

For example, the acceleration/deceleration ending point 36D illustrated in FIG. 9 is assumed to be used as the information indicating the WP 32 at which acceleration/deceleration is ended. In this case, the determination unit 20G specifies, as the acceleration/deceleration end scheduled space 51D, the acceleration/deceleration ending point 36D and a predetermined number of (for example, two) WPs 32 adjacent to the acceleration/deceleration ending point 36D on the scheduled traveling route 30. The determination unit 20G then determines a region 52D around the acceleration/deceleration end scheduled space 51D on the scheduled traveling route 30 in the space after interference 50B to be the third region 48.

The region 52D around the acceleration/deceleration end scheduled space 51D is different from the acceleration/deceleration end scheduled space 51D in the search space 40 in at least one of the position in the two-dimensional coordinate space (sd coordinate space) and the scheduled passing time or the scheduled passing speed (v).

FIG. 9 illustrates an example of a case in which the region 52C of the deviation end scheduled space 51C is determined to be the third region 48. The determination unit 20G may determine at least one of the region 52C and the region 52D in the space after interference 50B to be the third region 48.

Thus, the determination unit 20G is not limited to a form of determining the region 52C to be the third region 48.

The determination unit 20G may determine at least the second region 46 to be a region to which the node N2 is additionally arranged. However, it is preferable that the determination unit 20G determines the second region 46 and the third region 48 to be regions to which the node N2 is additionally arranged.

The determination unit 20G may determine at least one of the region 52A and the region 52B in the space before interference 50A and the region 52C and the region 52D in the space after interference 50B to be the third region 48.

FIG. 9 illustrates an example of a case in which the determination unit 20G determines the second region 46 and the third region 48 to be the regions in which the node N2 is arranged. FIG. 9 also illustrates an example of a case in which the determination unit 20G determines the region 52B in the space before interference 50A and the region 52C in the space after interference 50B to be third regions 48.

Returning to FIG. 2, the description will be continued. The deletion unit 20H deletes part of nodes N1 arranged in at least one of the space before interference 50A and the space after interference 50B among the nodes N1 arranged in the first region 44 by the first arrangement unit 20E.

Figure 10:
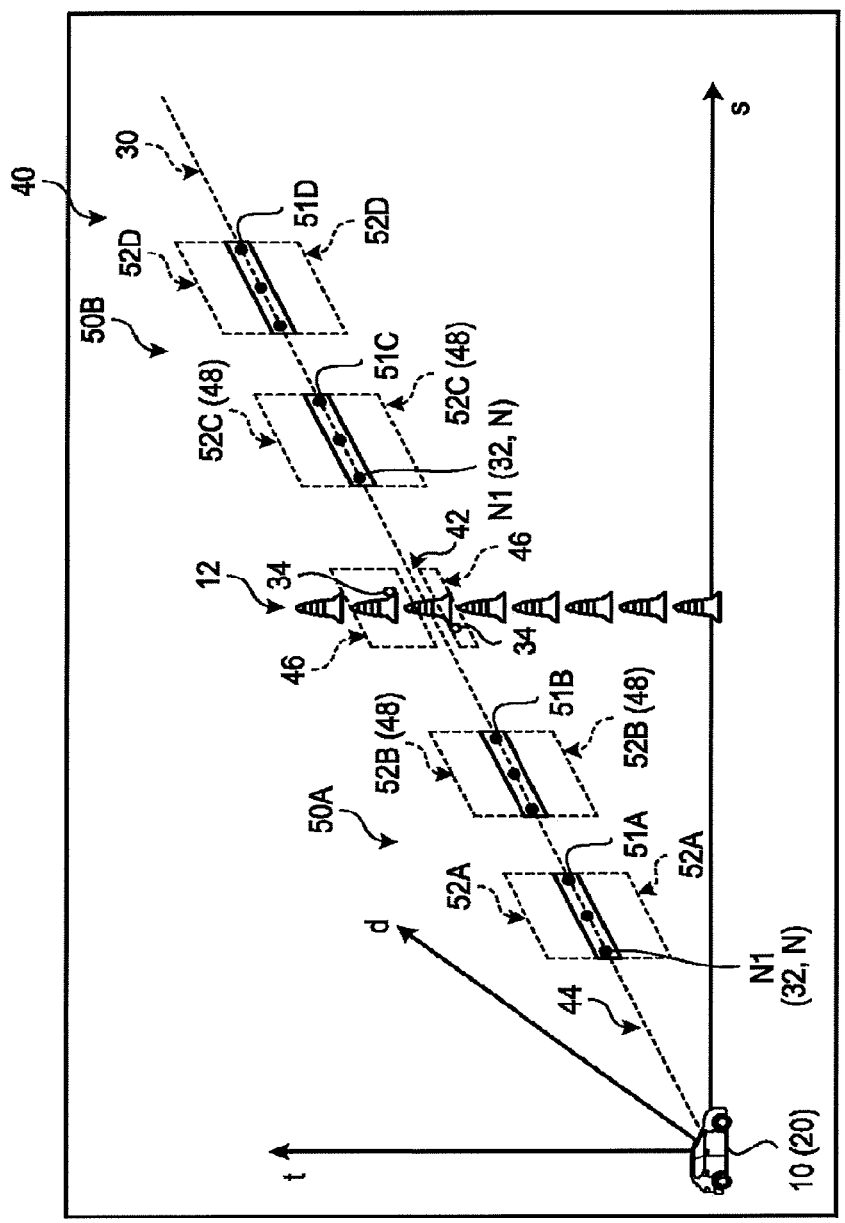
FIG. 10 is an explanatory diagram of deletion of the node.

FIG. 10 is an explanatory diagram of deletion of the node N1. For example, the deletion unit 20H deletes the node N1 arranged in a space other than at least one of the acceleration/deceleration start scheduled space 51A, the deviation start scheduled space 51B, the deviation end scheduled space 51C, and the acceleration/deceleration end scheduled space 51D among the nodes N1 arranged by the first arrangement unit 20E.

FIG. 10 illustrates a form in which the deletion unit 20H deletes the nodes N1 arranged in a space other than the acceleration/deceleration start scheduled space 51A, the deviation start scheduled space 51B, the deviation end scheduled space 51C, and the acceleration/deceleration end scheduled space 51D among the nodes N1 arranged on the scheduled traveling route 30.

When the deletion unit 20H deletes part of the nodes N1 to leave minimum nodes N1, a route 60 (details will be described later) to be searched for can be prevented from being a zigzag shape.

When there is plenty of time for calculation and the route 60 having a zigzag shape can be smoothed, the WP 32 is not necessarily deleted.

Returning to FIG. 2, the description will be continued. The second arrangement unit 20I arranges the node N2 in the second region 46. That is, the second arrangement unit 20I arranges the node N2 in the second region 46 in the search space 40.

Figure 11:
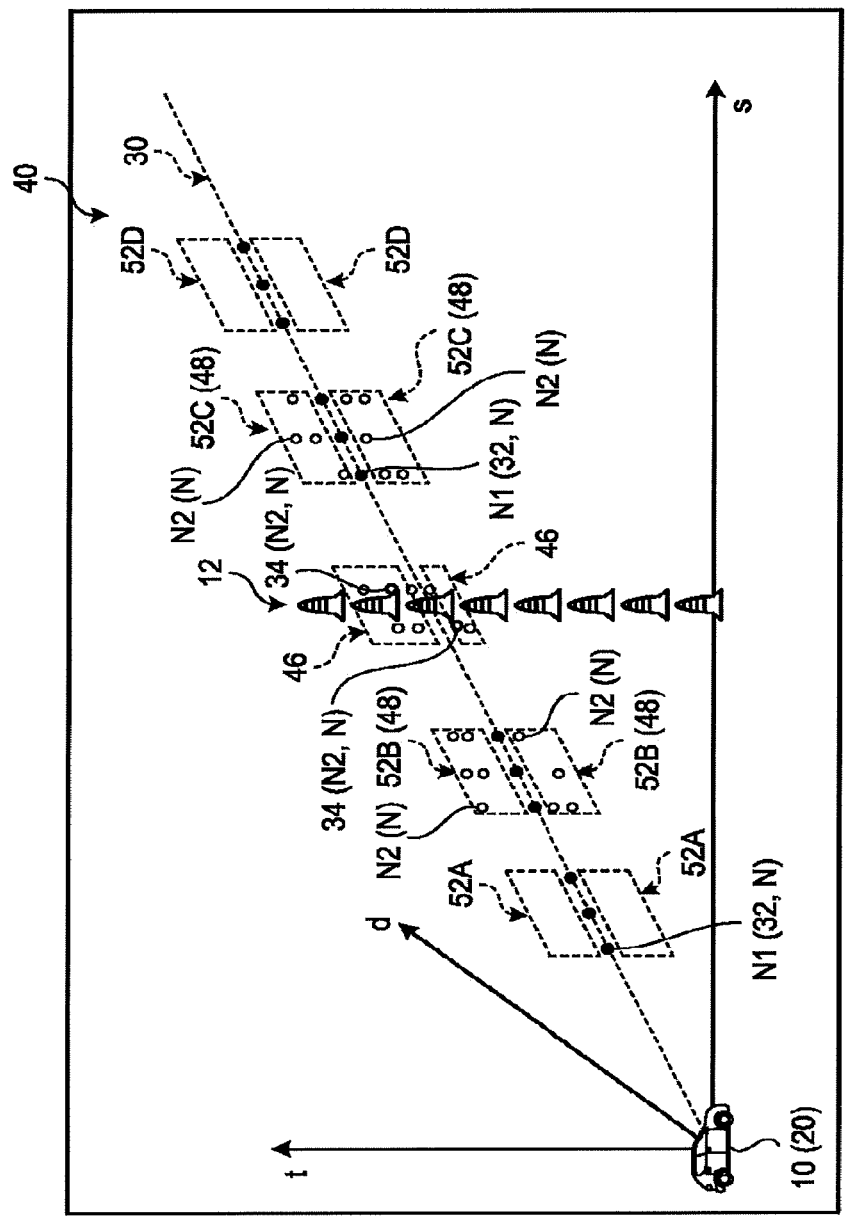
FIG. 11 is an explanatory diagram of arrangement of the node.

FIG. 11 is an explanatory diagram of arrangement of the node N2.

In the present embodiment, out of the second region 46 and the third region 48 determined to be targets in which the node N2 is arranged, the second arrangement unit 20I arranges the node N2 in at least the second region 46.

At this point, the second arrangement unit 20I arranges, in the second region 46, a plurality of nodes N2 different from each other in at least one of the position in the two-dimensional coordinate space (sd coordinate space) and the scheduled passing time (t) or the scheduled passing speed (v). The second arrangement unit 20I arranges the nodes N2 at plurality of points including at least the local minimum point 34 included in the second region 46.

Specifically, the second arrangement unit 20I arranges the node N2 at the local minimum point 34 in the second region 46. The second arrangement unit 20I arranges the node N2 at a position obtained by shifting the local minimum point 34 toward a scheduled passing time axis (t-axis) direction to be distant from the scheduled traveling route 30. A shift amount thereof may be set in advance, or may be a random value.

The second arrangement unit 20I preferably arranges the nodes N2 in the second region 46 with higher density than that of the nodes N1 arranged in the first region 44 on the scheduled traveling route 30.

In this way, the information processing device 20 according to the present embodiment arranges the nodes N1 in the first region 44 not interfering with the object 12 on the scheduled traveling route 30, and for the interference region 42 interfering with the object 12, the information processing device 20 arranges the nodes N2 in the second region 46 around the interference region 42 with higher density than that of the nodes N1.

As described above, the second arrangement unit 20I preferably arranges the node N2 in the third region 48 in addition to the second region 46. FIG. 11 illustrates a form in which the region 52B and the region 52C are determined to be the third regions 48. In this case, the second arrangement unit 20I arranges the nodes N2 in the region 52B and the region 52C as the third regions 48.

At this point, the second arrangement unit 20I arranges, in the third region 48, the nodes N2 different from each other in a east one of the position in the two-dimensional coordinate space (sd coordinate space) and the scheduled passing time (t) or the scheduled passing speed (v).

Specifically, the second arrangement unit 20I arranges the nodes N2 at positions obtained by shifting the WPs 32 included in the regions (the acceleration/deceleration start scheduled space 51A, the deviation start scheduled space 51B, the deviation end scheduled space 51C, and the acceleration/deceleration end scheduled space 51D) of the scheduled traveling route 30 corresponding to the third region 48 toward the scheduled passing time axis (t-axis) direction to be distant from the scheduled traveling route 30. The shift amount may be set in advance, or may be a random value.

The second arrangement unit 20I preferably arranges the nodes N2 in the third region 48 with higher density than that of the nodes N1 arranged in the first region 44 on the scheduled traveling route 30.

In this way, the information processing device 20 according to the present embodiment selectively adds the nodes N2 to be arranged with high density not in the entire region around the scheduled traveling route 30 but in a specific region.

All of the regions 52A, 52B, 52C, and 52D may be determined to be the third regions 46 in some cases. In this case, the second arrangement unit 20I may arrange a plurality of nodes N2 in each of the region 52A, the region 52B, the region 52C, and the region 52D.

Returning to FIG. 2, the description will be continued. Next, the following describes the search unit 20J. The search unit 20J searches for a route.

Figure 12:
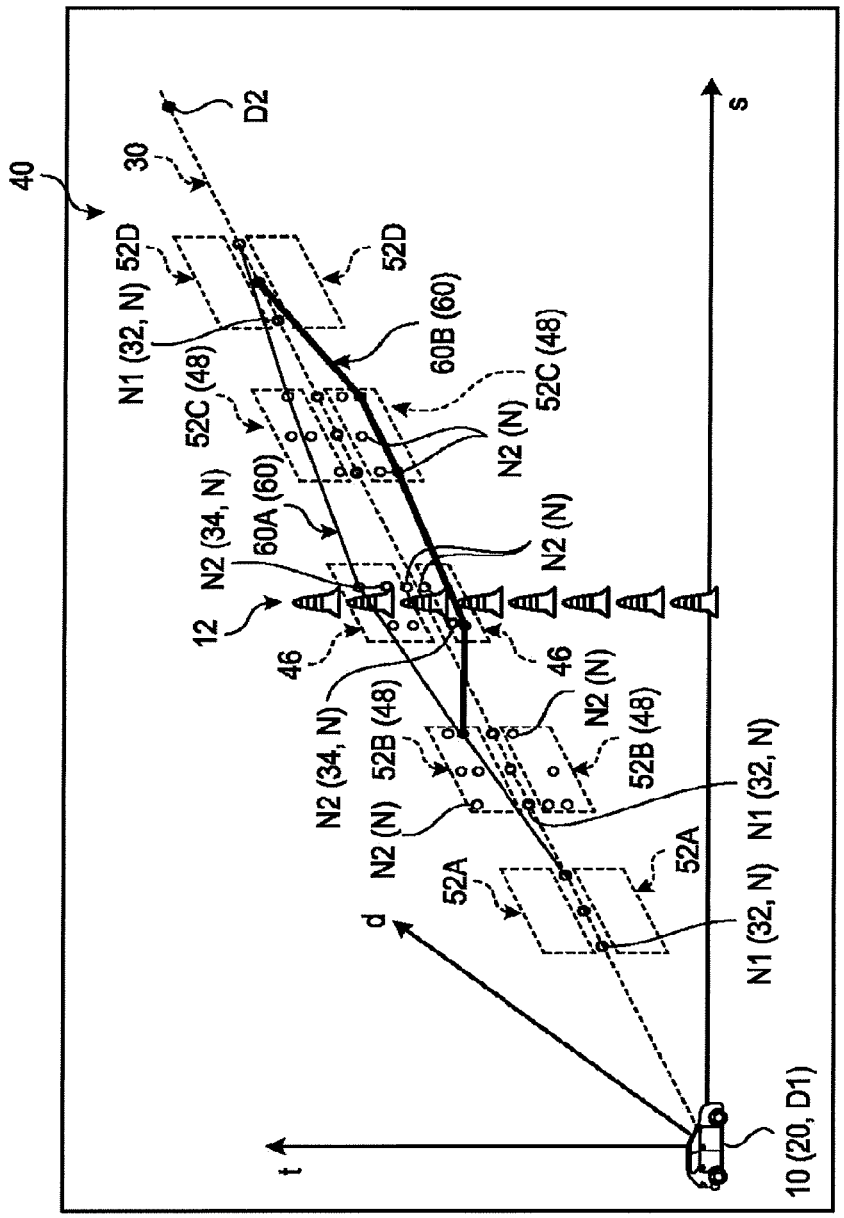
FIG. 12 is an explanatory diagram of search of a route.

FIG. 12 is an explanatory diagram of search of the route 60. The search unit 20J searches for the route 60 going through a plurality of nodes N (the node N1, the node N2) and having a moving cost from a first point D1 to a second point D2 equal to or smaller than a threshold.

The first point D1 is a specific point. Specifically, the first point D1 is a departure point or a present position of the mobile object 10. The first point D1 may be a specific point on the scheduled traveling route 30, or a point deviating from the scheduled traveling route 30. For example, the center in the vehicle width direction of the mobile object 10 may be shifted from the center of the traveling possible region E. In such a case, the first point D1 is a position shifted in the vehicle width direction from the scheduled traveling route 30.

The second point D2 is a point different from the first point D1 on the scheduled traveling route 30. The second point D2 is a point on a downstream side of the traveling direction with respect to the first point D1 on the scheduled traveling route 30. Specifically, the second point D2 is a destination on the scheduled traveling route 30.

The second arrangement unit 20I may further arrange the node N2 in a region around the second point D2. In this case, the second arrangement unit 20I may arrange a plurality of nodes N2 in a region around the second point D2 in the search space 40. Specifically, the second arrangement unit 20I arranges the nodes N2 at positions obtained by shifting the second point D2 toward the scheduled passing time axis (t-axis) direction to be distant from the scheduled traveling route 30.

In this case, the second arrangement unit 20I preferably arranges the nodes N2 in the region around the second point 22 with higher density than that of the nodes N1 arranged in the first region 44 on the scheduled traveling route 30.

The moving cost is represented by time and energy required for movement between two points, that is, the first point D1 and the second point D2. The moving cost is, for example, a value corresponding to a distance in a straight line between the two points, a sum of a plurality of distances in a straight line between the two points, and the like. The moving cost may be a value obtained by weighting the distance in accordance with a movement environment along the scheduled traveling route 30.

The search unit 20J generates a plurality of routes 60 from the first point 21 toward the second point D2 by connecting a plurality of nodes N (the node N1, the node N2) in a mesh-like manner from the first point D1 toward the second point D2.

In the present embodiment, the search unit 20J generates a plurality of routes 60 connecting the first point D1, at least one node N included in the acceleration/deceleration start scheduled space 51A and the region 52A, at least one node N included in the deviation start scheduled space 51B and the region 52B, at least one node N included in the second region 46, at least one node N included in the deviation end scheduled space 51C and the region 52C, at least one node N included in the acceleration/deceleration end scheduled space 51D and the region 52D, and the second point D2.

The search unit 20J searches for the route 60 having the moving cost that is equal to or smaller than the threshold from among the generated routes 60.

By way of example, FIG. 12 illustrates a route 60A having the lowest moving cost, and a route 60B having the next lowest moving cost.

The moving cost may be calculated using a known method. For example, the search unit 20J may calculate the moving cost of each of the routes 60 using a Dijkstra method.

The search unit 20J preferably calculates the moving cost using the following Expression (1).

$$C_e(t) = w_v C_v(t) + w_\psi C_\psi(t) + w_\varepsilon C_\varepsilon(t) \tag{1}$$

In the expression (1), $C_e(t)$ represents the moving cost of an edge connecting adjacent nodes N in the route 60. That is, the search unit 20J calculates the sum total of the moving cost calculated for each edge included in the route 60 as the moving cost of the route 60.

In the Expression (1), $C_v(t)$ represents a jerk degree of the edge. The jerk degree is a rate of change in acceleration per unit time, and represented by a vector quantity. $C_\psi(t)$ represents a yaw angle jerk degree of the edge. $C_\varepsilon(t)$ represents a normalized distance of the edge, and is represented by the following Expression (2). $W_v$, $W_\psi$, and $W_\varepsilon$ are weighting values, which are determined in advance.

$$C_\varepsilon(t) = \frac{\varepsilon_{km} - \varepsilon_{min}}{\varepsilon_{max} - \varepsilon_{min}} \tag{2}$$

In the Expression (2), $\varepsilon_{km}$ represents a deviation between $\xi_{km}$ and $V_{km}$, and is represented by the following Expression (3). $\varepsilon_{min}$ represents the smallest $\varepsilon_{km}$, and $\varepsilon_{max}$ represents the largest $\varepsilon_{km}$. k represents a serial number of an N1 group and an N3 group, and m represents a serial number of an N2 group arranged from N1(k) or N3(k). $\xi_k$ represents N1 and N3. $V_{km}$ represents N2. The N1 group represents a group of the nodes N1. The N2 group represents a group of the nodes N2 arranged in the second region 46 among a plurality of nodes N2. The N3 group represents a group of the nodes N2 arranged in the third region 48 among a plurality of nodes N2. N2 represents the node N2 arranged in the second region 46 among a plurality of nodes N2. N3 represents the node N2 arranged in the third region 48 among a plurality of nodes N2.

$$\varepsilon_{km} = \sqrt{(V_{km\_s} - \zeta_{k\_s})^2 + (V_{km\_d} - \zeta_{k\_d})^2 + (V_{km\_t} - (\zeta_{k\_t} + t_\eta))^2} \tag{3}$$

In the Expression (3), $V_{km\_s}$ represents a value of an s-axis component of $V_{km}$. $\xi_{k\_s}$ represents N1 and N3. $V_{km\_d}$ represents a value of a d-axis component of $V_{km}$. $V_{km\_t}$ represents a value of a t-axis component of $V_{km}$. $t_\eta$ represents an offset amount of $\xi_{k\_t}$, and is represented by the following Expression (4).

$$t_\eta = V_{(k-1)m\_t} - \xi_{(k-1)\_t} \tag{4}$$

In the Expression 4, $V_{(k-1)m}$ represents the node (N2) at a distal end of a searched graph. $\xi_{(k-1)}$ represents the node N1 and the node N3 as a source of sampling of $V_{(k-1)m}$. In the Expression 4, t is the same as that in the above Expression (3), and represents a value of the t-axis component. In the Expression (3), $t_\eta$ is set to prevent, when $V_{(k-1)m}$ deviates from $\xi_{(k-1)}$, rapid acceleration/deceleration caused when $V_{km}$ approaches $\iota_k$, and to cause $V_{km}$ the speed of which is close to that of the WP 32 to be easily selected.

By using the Expressions (1) to (4) described above, the search unit 20J can calculate the moving cost with higher accuracy for each of searched routes 60.

When the coordinate axis orthogonal to the two-dimensional coordinate space (sd coordinate space) in the search space 40 is the scheduled passing speed axis (v), an expression not including $t_\eta$ may be used as the Expression (3) described above. On the other hand, when the coordinate axis orthogonal to the two-dimensional coordinate space (sd coordinate space) in the search space 40 is the scheduled passing time axis (t), it is preferable to calculate the moving cost using the Expression (1) to (4) described above.

As described above, the search unit 20J generates a plurality of routes 60 from the first point D1 toward the second point D2 by connecting a plurality of nodes N (the node N1, the node N2) in a mesh-like manner from the first point D1 toward the second point D2. The search unit 20J then calculates the moving cost of each of the routes 60 as described above.

The search unit 20J searches for one or a plurality of routes 60 having the moving cost that is equal to or smaller than the threshold from among a plurality of routes 60. The threshold may be determined in advance. The search unit 20J may search for a predetermined number of routes 60 in ascending order of the moving cost from the lowest moving cost, from among a plurality of routes 60. The search unit 20J may search for one route 60 having the lowest moving cost from among a plurality of routes 60.

Returning to FIG. 2, the description will be continued. The generation unit 20K generates a curved route using the route 60 searched for by the search unit 20J.

Figure 13:
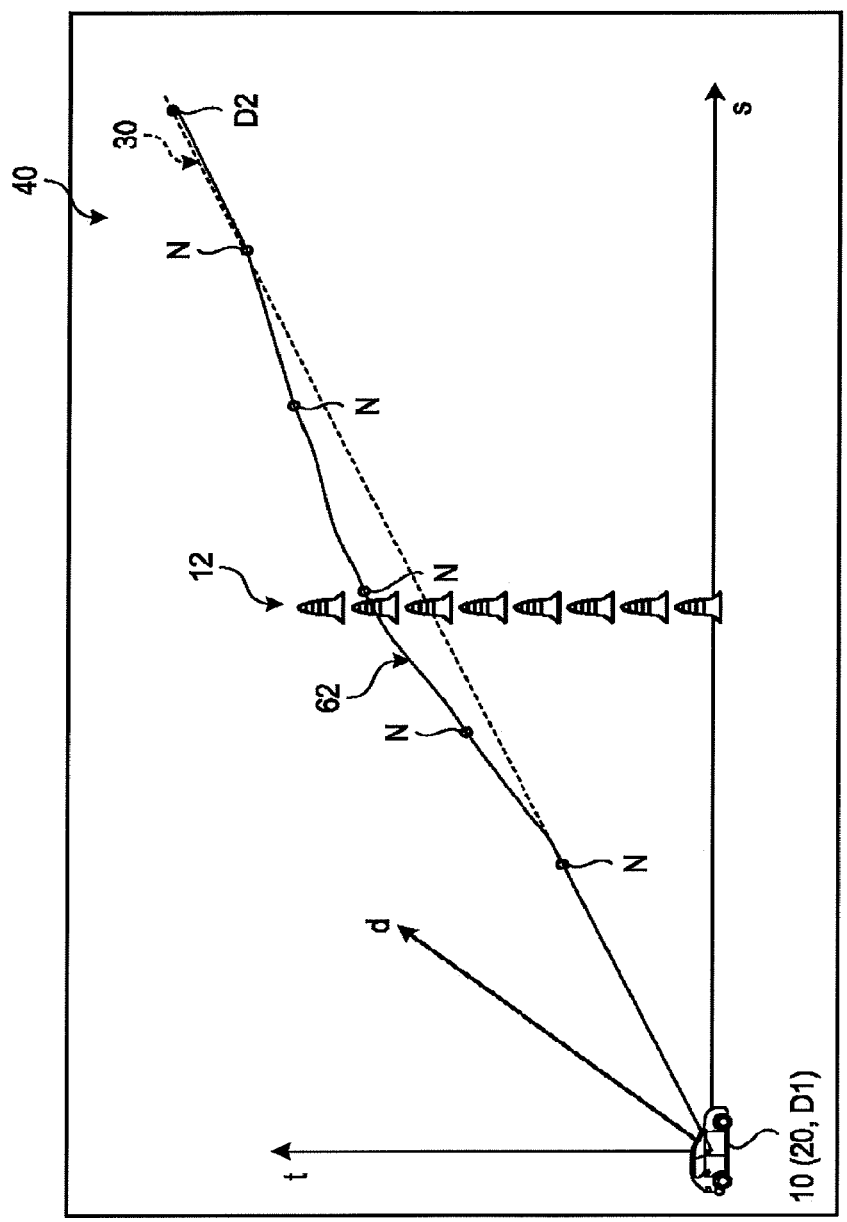
FIG. 13 is an explanatory diagram of a curved route.

FIG. 13 is an explanatory diagram of an example of a curved route 62. The curved route 62 is a route representing the route 60 with a curved line on which the mobile object 10 can travel.

The generation unit 20K may generate the curved route 62 from the route 60 using a known method.

As described above, the search unit 20J may search for a plurality of routes 60 having low moving cost in some cases. In this case, the generation unit 20K generates the curved route 62 for each of the searched routes 60. The generation unit 20K then specifies one curved route 62 having the moving cost that is the lowest from among a plurality of curved routes 62.

The generation unit 20K may calculate the cost of the curved route 62 using a known method.

Returning to FIG. 2, the description will be continued. The output control unit 20L outputs output information indicating the curved route 62 generated by the generation unit 20K. The output information may include information indicating the route 60 having the lowest moving cost searched for by the search unit 20J. The output information may be information including the route 60 in place of the curved route 62.

The output control unit 20L outputs the output information indicating the curved route 62 to the power control unit 10G that controls the power unit 10H of the mobile object 10.

Specifically, the output control unit 20L outputs the curved route to at least one of the power control unit 10G and the output unit 10A.

First, the following describes a case in which the output control unit 20L outputs the curved route 62 to the output unit 10A. For example, the output control unit 20L displays the output information including the curved route 62 on the display 10E. The output control unit 20L may control the speaker 10F to output a sound indicating the curved route 62. The output control unit 20L may output the output information indicating the curved route 62 to an external device via the communication unit 10D. The output control unit 20L may store the output information in the storage unit 20B.

Next, the following describes a case in which the output control unit 20L outputs the output information indicating the curved route 62 to the power control unit 10G. In this case, the power control unit 10G controls the power unit 10H in accordance with the curved route 62 received from the output control unit 20L.

For example, the power control unit 10G generates a power control signal for controlling the power unit 10H using the curved route 62, and controls the power unit 10H. The power control signal is a control signal for controlling a driving unit that performs driving related to traveling of the mobile object 10 in the power unit 10H. The power control signal includes a control signal for adjusting a steering angle, an accelerator quantity, and the like.

Specifically, the power control unit 10G acquires a present position, a posture, and speed of the mobile object 10 from the sensor 10B.

The power control unit 10G then uses these pieces of information acquired from the sensor 10B and the curved route 62 to generate the power control signal so that a deviation between the curved route 62 and the present position of the mobile object 10 becomes zero, and outputs the power control signal to the power unit 10H.

Due to this, the power control unit 10G controls the power unit 10H (steering of the mobile object 10, an engine, and the like) to perform traveling along the curved route. Thus, the mobile object 10 travels along the route corresponding to the curved route 62.

At least part of processing for generating the power control signal from the curved route 62 may be performed by the output control unit 20L.

Next, the following describes an information processing procedure executed by the processing unit 20A.

Figure 14:
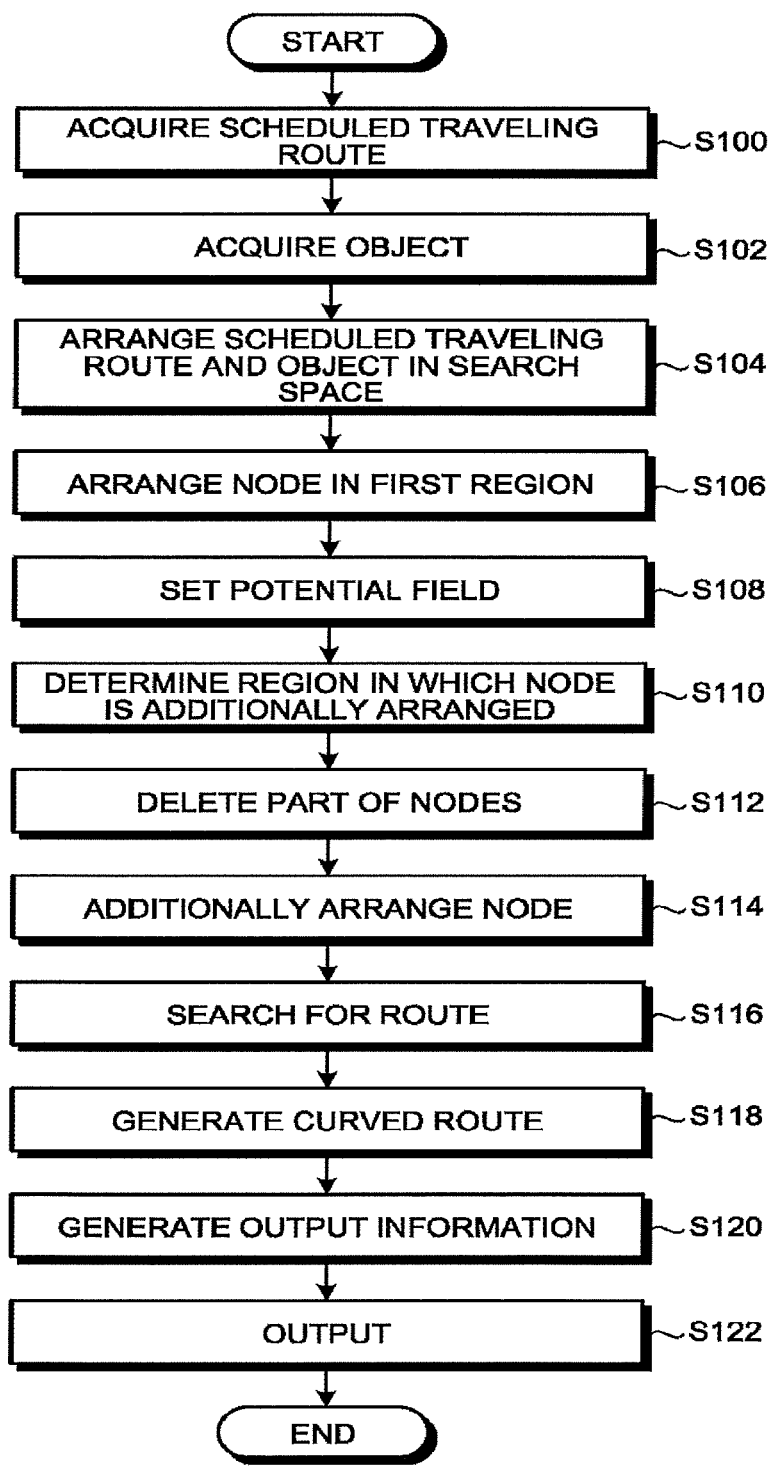
FIG. 14 is a flowchart illustrating an example of an information processing procedure.

FIG. 14 is a flowchart illustrating an example of the information processing procedure executed by the processing unit 20A.

First, the acquisition unit 20C acquires the scheduled traveling route 30 (Step S100). Next, the acquisition unit 20C acquires the object 12 (Step S102). The space constituting unit 20D then arranges the scheduled traveling route 30 and the object 12 in the search space 40 (Step 104).

Subsequently, the first arrangement unit 20E arranges the node N1 in the first region 44 of the scheduled traveling route 30 (Step S106). Next, the setting unit 20B sets the potential field 43 in the search space 40 (Step S108).

The determination unit 20G then determines a region in which the node N2 is additionally arranged (Step 110). For example, the determination unit 20G determines the second region 46 and the third region 48 to be regions in which the node N2 is additionally arranged.

Next, the deletion unit 20H deletes part of the nodes N1 arranged in at least one of the space before interference 50A and the space after interference 50B from among the nodes N1 arranged in the first region 44 at Step S106 (Step S112).

Subsequently, the second arrangement unit 20I arranges the node N2 in the region determined at Step S110 (for example, the second region 46 and the third region 48) (Step S114).

The search unit 20J then searches for the route 60 having the traveling cost that is equal to or smaller than the threshold using the nodes N (the node N1, the node N2) arranged through the processing from Step S100 to Step S114 (Step S116).

Next, the generation unit 20K generates the curved route 62 by using the route 60 searched for at Step S116 (Step S118).

Subsequently, the generation unit 20K generates output information indicating the curved route 62 generated at Step S118 (Step S120), and outputs the output information (Step S122). This routine is then ended.

As described above, the information processing device 20 according to the present embodiment includes the first arrangement unit 20E, the second arrangement unit 20I, and the search unit 20J. The first arrangement unit 20E arranges the node N1 in the first region 44 not interfering with the object 12 on the scheduled traveling route 30. The second arrangement unit 20I arranges the node N2 in the second region 46 around the interference region 42 interfering with the object 12. The search unit 20J searches for the route 60 going through a plurality of nodes N (the node N1, the node N2) and having the moving cost from the first point D1 to the second point D2 on the scheduled traveling route 30 equal to or smaller than the threshold.

In this way, the information processing device 20 according to the present embodiment arranges the node N1 in the first region 44 not interfering with the object 12 on the scheduled traveling route 30, and for the interference region 42 interfering with the object 12, the information processing device 20 arranges the node N2 in the second region 46 around the interference region 42.

Thus, the information processing device 20 does not randomly arrange the nodes N in the entire region along the scheduled traveling route 30, but selectively arranges the nodes N in a specific region to be used for searching for the route 60.

Accordingly, the information processing device 20 according to the present embodiment can search for a quasi-optimal route 60.

With the information processing device 20 according to the present embodiment, processing time and a processing load can be reduced in addition to the effect described above as compared with a conventional system of randomly arranging the nodes N in the entire region.

Figure 15:
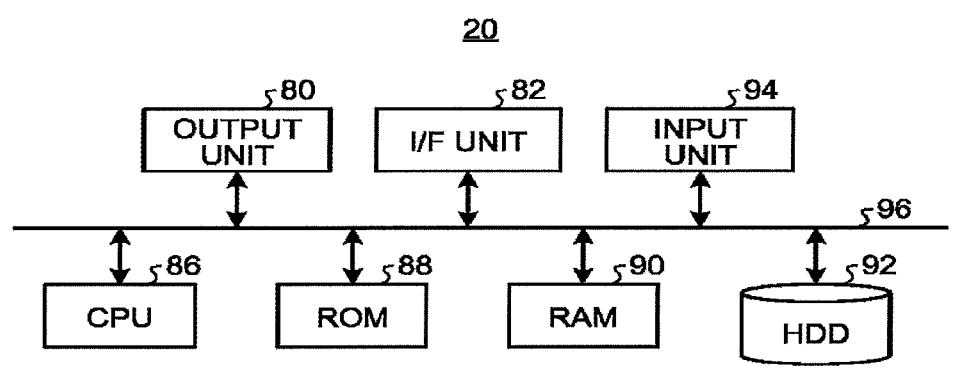
FIG. 15 a hardware configuration diagram.

Next, the following describes an example a hardware configuration of the information processing device 20 according to the embodiment described above. FIG. 15 is an example of a hardware configuration diagram of the information processing device 20 according to the embodiment described above.

The information processing device 20 according to the embodiment described above includes a control device such as a central processing unit (CPU) 86, a storage device such as a read only memory (ROM) 88, a random access memory (RAM) 90, and a hard disk drive (HDD) 92, an I/F unit 82 serving as an interface with various appliances, an output unit 80 that outputs various pieces of information such as output information, an input unit 94 that receives an operation performed by a user, and a bus 96 for connecting the components, and has a hardware configuration utilizing a typical computer.

In the information processing device 20 according to the embodiment described above, when the CPU 86 reads out a computer program from the ROM 88 to be executed on the RPM 90, the functions described above are implemented on the computer.

The computer program for executing the pieces of processing described above performed by the information processing device 20 according to the embodiment described above may be stored in the HDD 92. The computer program for executing the pieces of processing described above performed by the information processing device 20 according to the embodiment described above may be embedded and provided in the ROM 88.

The computer program for executing the processing described above performed by the information processing device 20 according to the embodiment described above may be stored on a computer-readable storage medium such as a compact disc read only memory (CD-ROM), a compact disc recordable (CD-R), a memory card, a digital versatile disc (DVD), and a flexible disk (FD), as an installable or executable file to be provided as a computer program product. The computer program for executing the processing described above performed by the information processing device 20 according to the embodiment described above may be stored in a computer connected to a network such as the Internet and provided by being downloaded via the network. The computer program for executing the processing described above performed by the information processing device 20 according to the embodiment described above may be provided or distributed via a network such as the Internet.

While certain embodiments have been described, these embodiments have been presented by way of example only, and are not intended to limit the scope of the inventions. Indeed, the novel embodiment described herein may be embodied in a variety of other forms; furthermore, various omissions, substitutions and changes in the form of the embodiment described herein may be made without departing from the spirit of the inventions. The accompanying claims and their equivalents are intended to cover such forms or modifications as would fall within the scope and spirit of the inventions.

What is claimed is:

1. An information processing device for autonomous driving of a motor vehicle, the information processing device comprising:
   a memory; and
   one or more processors coupled to the memory and configured to:
      arrange a first node in a first region not interfering with an object on a scheduled traveling route;
      arrange a second node in a second region around an interference region interfering with the object, the second node in the second region around the interference region interfering with the object having more number of reference points than the first node in the first region not interfering with the object; and
      search for a route going through a plurality of nodes and having a moving cost from a first point to a second point on the scheduled traveling route equal to or smaller than a threshold.

2. The information processing device according to claim 1, wherein the one or more processors are configured to arrange the scheduled traveling route and the object in a search space represented by a coordinate space along a traveling possible region of a mobile object moving on the scheduled traveling route and a scheduled passing time axis or a scheduled passing speed axis orthogonal to the coordinate space, arrange the first node in the first region in the search space, and arrange the second node in the second region in the search space with higher density than density in the first region.

3. The information processing device according to claim 2, wherein the second region is a space being different from the object interfering with the scheduled traveling route in the search space in at least one of a position in the coordinate space and scheduled passing time or scheduled passing speed.

4. The information processing device according to claim 3, wherein the one or more processors arrange, in the second region, the nodes different from each other in at least one of the position in the search space and the scheduled passing time or the scheduled passing speed.

5. The information processing device according to claim 2, wherein the one or more processors arrange a third node in a third region deviating from the scheduled traveling route in at least one of a space before interference before scheduled passing time at which the scheduled traveling route interferes with the object or scheduled passing speed at a position where the scheduled traveling route interferes with the object, and a space after interference after the scheduled passing time at which the scheduled traveling route interferes with the object or the scheduled passing speed at a position where the scheduled traveling route interferes with the object, in the search space.

6. The information processing device according to claim 5, wherein the one or more processors arrange, in the third region, the nodes different from each other in at least one of a position in the coordinate space and the scheduled passing time or the scheduled passing speed.

7. The information processing device according to claim 5, wherein the one or more processors arrange the third node in the third region around at least one of an acceleration/deceleration start scheduled space in which a mobile object traveling on the scheduled traveling route starts acceleration/deceleration before interfering with the object and a deviation start scheduled space in which deviation from the scheduled traveling route is started to avoid the object, in the space before interference.

8. The information processing device according to claim 5, wherein the one or more processors arrange the third node in the third region around at least one of a deviation end scheduled space in which deviation from the scheduled traveling route is ended and an acceleration/deceleration end scheduled space in which acceleration/deceleration is ended, in the space after interference.

9. The information processing device according to claim 5, wherein the one or more processors are configured to set a potential field indicating a lower potential value as being closer to the scheduled traveling route or more distant from the object, in the search space, and arrange the second node in the second region including a local minimum point indicating a local minimum peak of the lower potential value indicated by the potential field in the search space, and a peripheral region of the local minimum point.

10. The information processing device according to claim 5, wherein the one or more processors are configured to delete part of the nodes arranged in at least one of the space before interference and the space after interference among the nodes arranged in the first region.

11. The information processing device according to claim 1, wherein the one or more processors are configured to generate a curved route obtained by representing the route with a curved line on which a mobile object is capable of traveling.

12. The information processing device according to claim 11, wherein the one or more processors specify the curved route having lowest moving cost among a plurality of curved routes generated from the route.

13. The information processing device according to claim 11, wherein the one or more processors are configured to output information indicating the curved route.

14. The information processing device according to claim 13, wherein the one or more processors are configured to control a power unit of the mobile object by using the output information.

15. A mobile object comprising:
the information processing device according to claim 1.

16. An information processing method for autonomous driving of a motor vehicle, the information processing method comprising:
arranging a first node in a first region not interfering with an object on a scheduled traveling route;
arranging a second node in a second region around an interference region interfering with the object, the second node in the second region around the interference region interfering with the object having more number of reference points than the first node in the first region not interfering with the object; and
searching for a route going through a plurality of nodes and having a moving cost from a first point to a second point on the scheduled traveling route equal to or smaller than a threshold.

17. A non-transitory computer readable medium storing computer readable instructions thereon that, when executed by a computer, causes the computer to perform a method for autonomous driving of a motor vehicle, the method comprising:
arranging a first node in a first region not interfering with an object on a scheduled traveling route;
arranging a second node in a second region around an interference region interfering with the object, the second node in the second region around the interference region interfering with the object having more number of reference points than the first node in the first region not interfering with the object; and
searching for a route going through a plurality of nodes and having a moving cost from a first point to a second point on the scheduled traveling route equal to or smaller than a threshold.

* * * * *